(12) United States Patent
Mamishin

(10) Patent No.: US 12,443,039 B2
(45) Date of Patent: Oct. 14, 2025

(54) EYE INFORMATION DETECTION DEVICE AND IMAGE DISPLAY APPARATUS

(71) Applicant: SONY GROUP CORPORATION, Tokyo (JP)

(72) Inventor: Yuki Mamishin, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 528 days.

(21) Appl. No.: 17/756,726

(22) PCT Filed: Nov. 12, 2020

(86) PCT No.: PCT/JP2020/042245
§ 371 (c)(1),
(2) Date: Jun. 1, 2022

(87) PCT Pub. No.: WO2021/117409
PCT Pub. Date: Jun. 17, 2021

(65) Prior Publication Data
US 2023/0012288 A1  Jan. 12, 2023

(30) Foreign Application Priority Data
Dec. 10, 2019  (JP) ................................ 2019-222596

(51) Int. Cl.
*G02B 27/01*  (2006.01)
*A61B 3/10*  (2006.01)
(Continued)

(52) U.S. Cl.
CPC ............ *G02B 27/0172* (2013.01); *A61B 3/10* (2013.01); *G02B 5/18* (2013.01); *G02B 27/10* (2013.01); *G02B 27/18* (2013.01)

(58) Field of Classification Search
CPC .... G02B 27/1006; G02B 27/10; G02B 27/18; G02B 5/18; G02B 27/4272;
(Continued)

(56) References Cited

U.S. PATENT DOCUMENTS

2013/0207887 A1* 8/2013 Raffle ................ G02B 27/0176
345/156
2016/0018639 A1* 1/2016 Spitzer ............... G02B 27/0103
359/13

(Continued)

FOREIGN PATENT DOCUMENTS

CN     105361851 A    3/2016
JP     2016-049259 A  4/2016
(Continued)

OTHER PUBLICATIONS

International Search Report and Written Opinion of PCT Application No. PCT/JP2020/042245, issued on Jan. 19, 2021, 08 pages of ISRWO.

*Primary Examiner* — Jennifer D. Carruth
(74) *Attorney, Agent, or Firm* — CHIP LAW GROUP

(57) ABSTRACT

The present technology provides an eye information detection device including two or more non-visible light sources, a diffractive optical element, and a light reception system. The two or more non-visible light sources have different light emission wavelengths. The diffractive optical element is disposed on an optical path of non-visible light emitted from each of the two or more non-visible light sources and reflected by an eye. The light reception system receives the non-visible light reflected by the eye and passing through the diffractive optical element. According to the present technology, it is possible to make improvement regarding the highly accurate detection of the information of the eye.

31 Claims, 24 Drawing Sheets

(51) Int. Cl.
  *G02B 5/18* (2006.01)
  *G02B 27/10* (2006.01)
  *G02B 27/18* (2006.01)
(58) Field of Classification Search
  CPC ............... G02B 27/0093; G02B 27/14; G02B 27/0172; G02B 5/3083; G02B 2027/0138; G02B 2027/014; A61B 3/14; A61B 3/10; G06F 3/0304; G06F 3/013; G02F 1/13; G06T 7/74; G06T 2207/10152; G06T 2207/30041
  See application file for complete search history.

(56) References Cited

U.S. PATENT DOCUMENTS

| | | | |
|---|---|---|---|
| 2017/0031160 A1* | 2/2017 | Popovich | G02F 1/2955 |
| 2017/0131765 A1 | 5/2017 | Perek et al. | |
| 2019/0041634 A1* | 2/2019 | Popovich | G01S 17/66 |
| 2019/0086674 A1* | 3/2019 | Sinay | G02B 27/0172 |
| 2019/0155046 A1* | 5/2019 | Wall | G06F 3/013 |
| 2019/0286228 A1 | 9/2019 | Sangu | |
| 2020/0394400 A1* | 12/2020 | Tornéus | G02B 27/4205 |
| 2021/0088789 A1* | 3/2021 | Yang | G02B 3/0056 |
| 2022/0035161 A1* | 2/2022 | Sinay | G02B 27/0172 |

FOREIGN PATENT DOCUMENTS

| | | |
|---|---|---|
| JP | 2018-530781 A | 10/2018 |
| JP | 2019-506017 A | 2/2019 |
| JP | 2019-154815 A | 9/2019 |
| WO | 2019/187958 A1 | 10/2019 |

* cited by examiner

[FIG. 1]
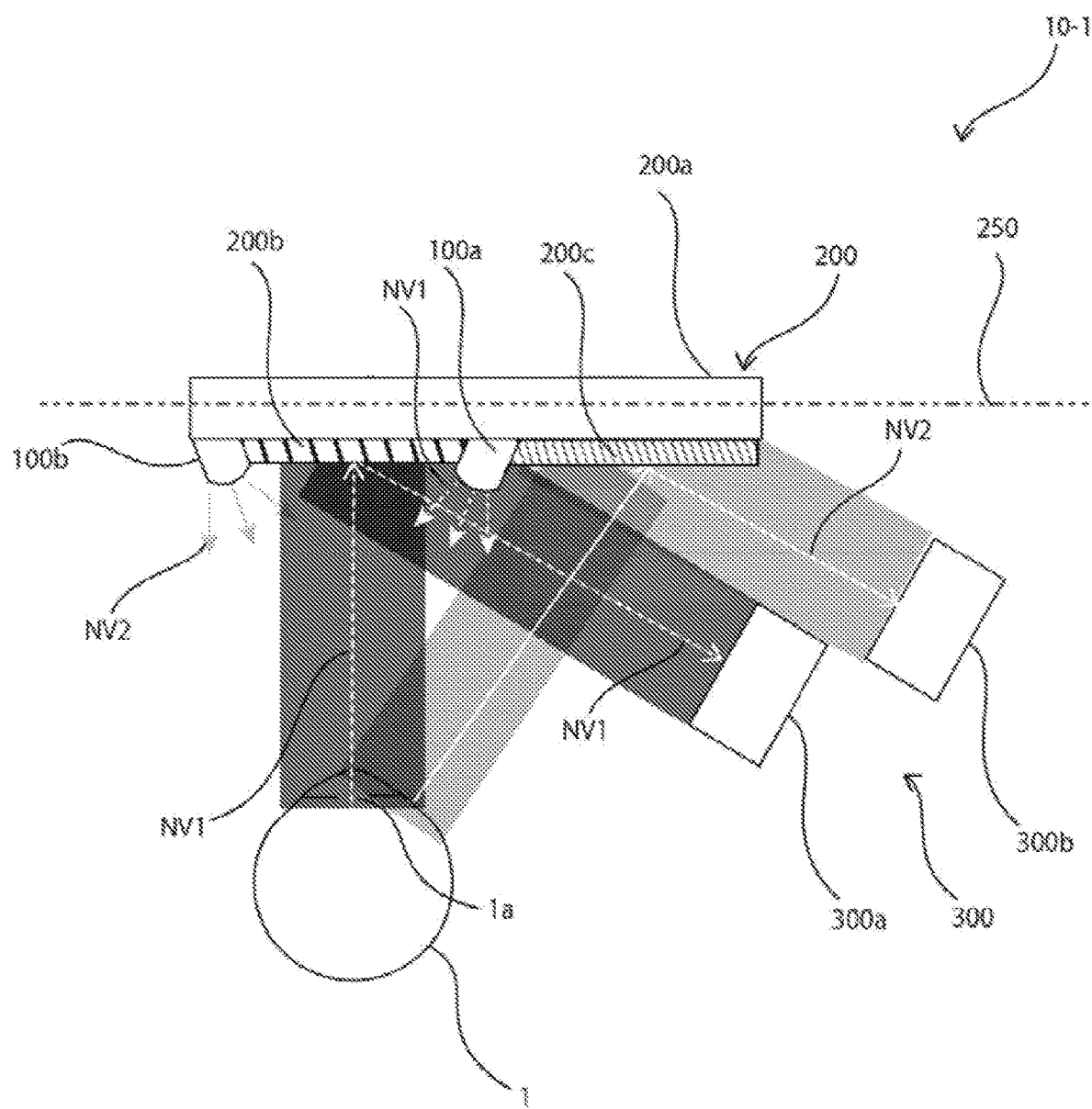

[FIG. 2]
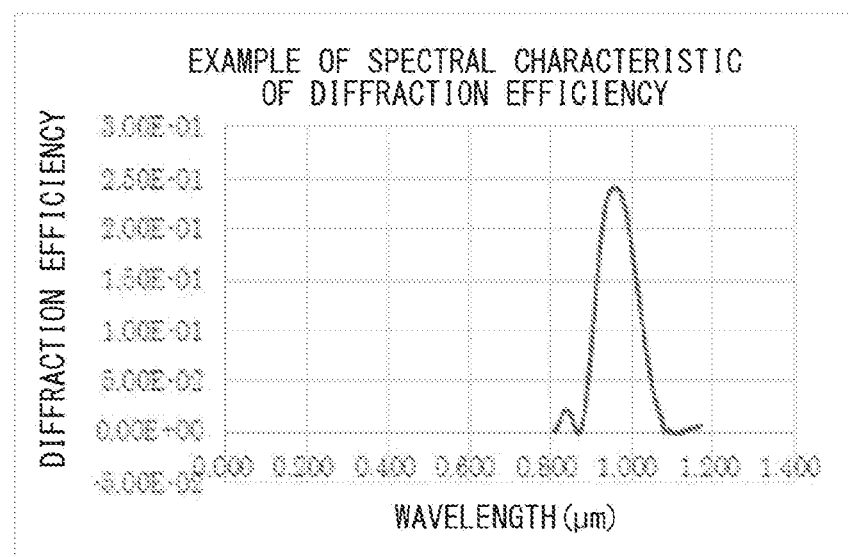

[FIG. 3]
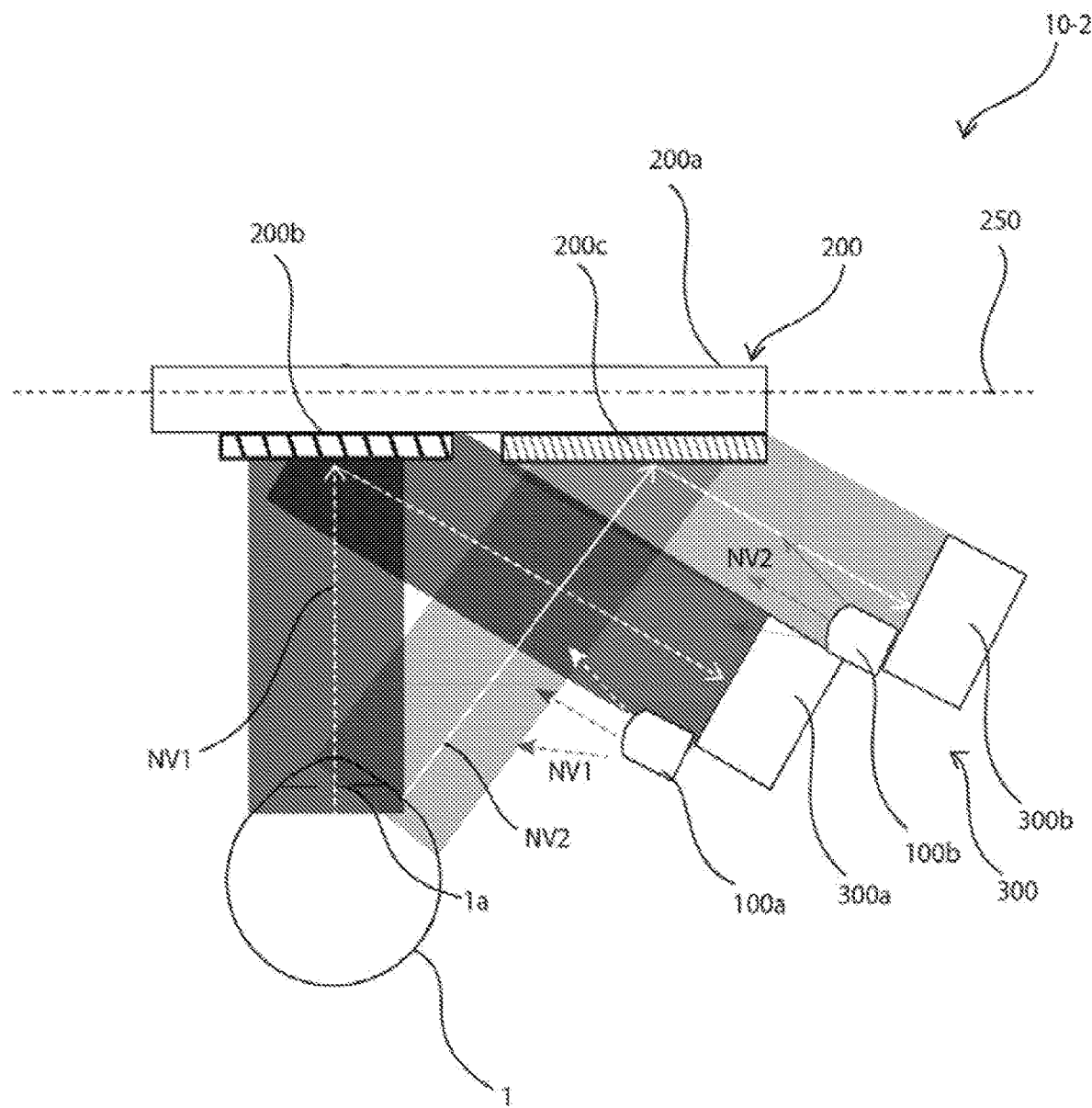

[FIG. 4]
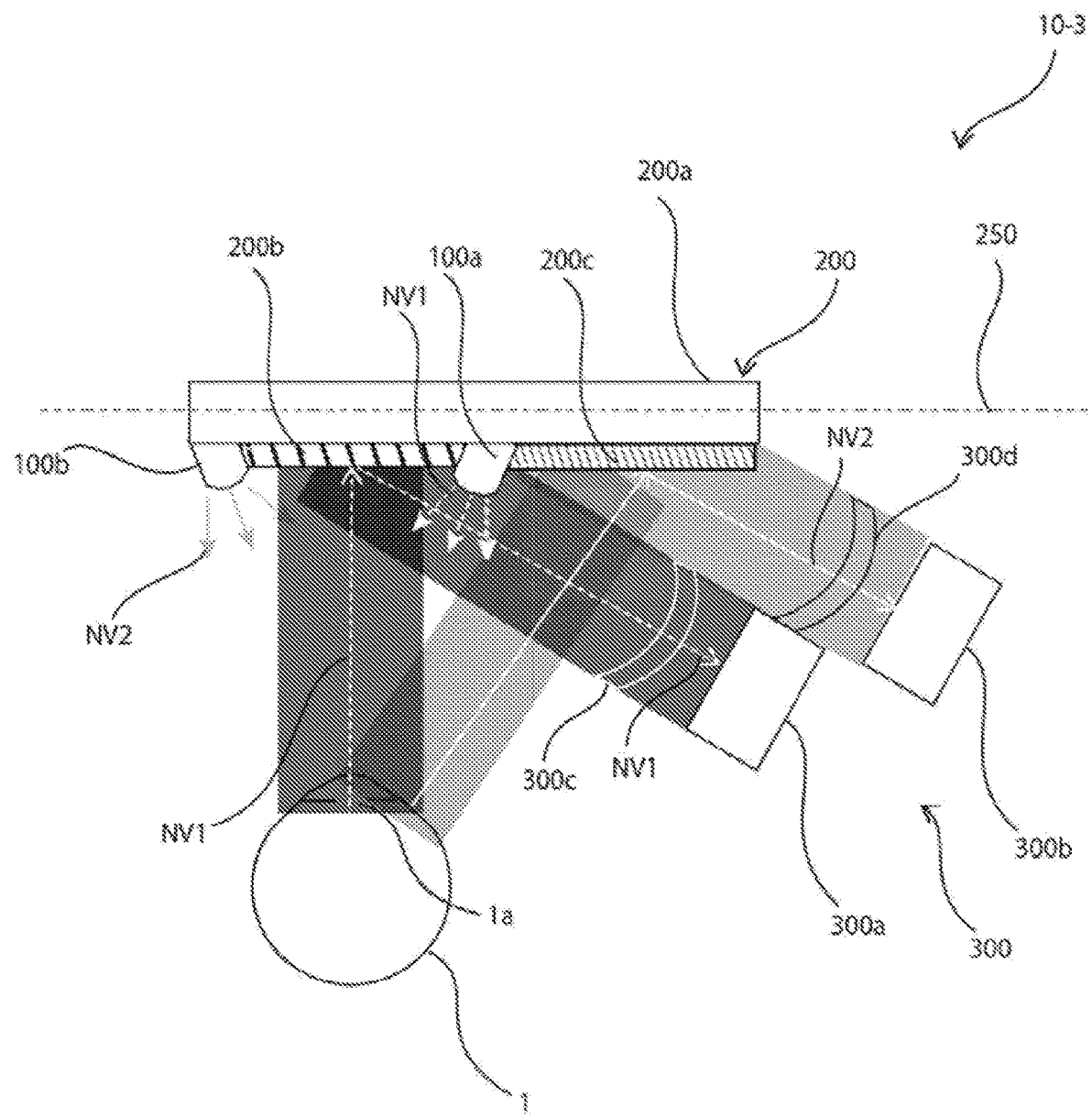

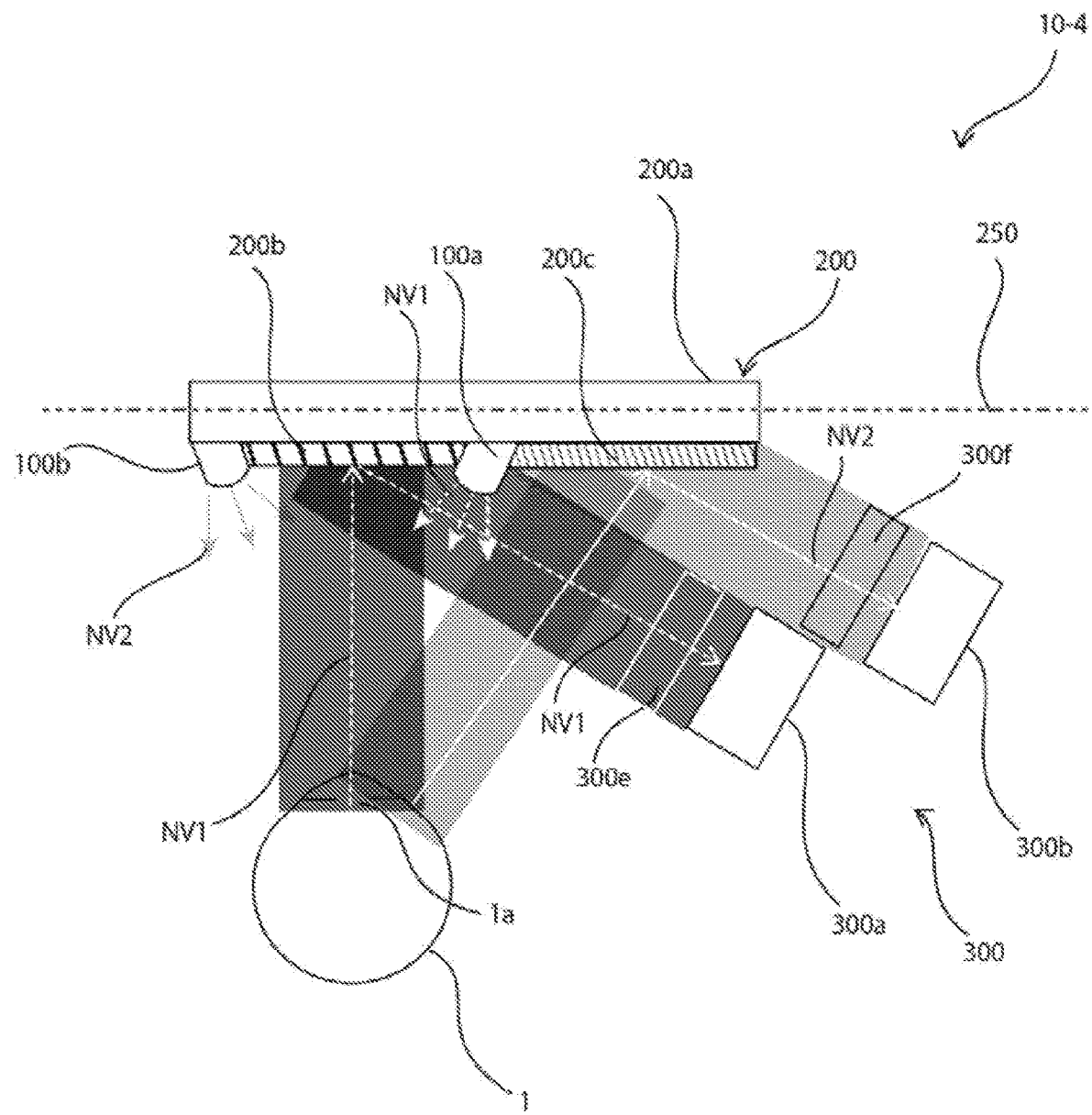
[FIG. 5]

[FIG. 6]
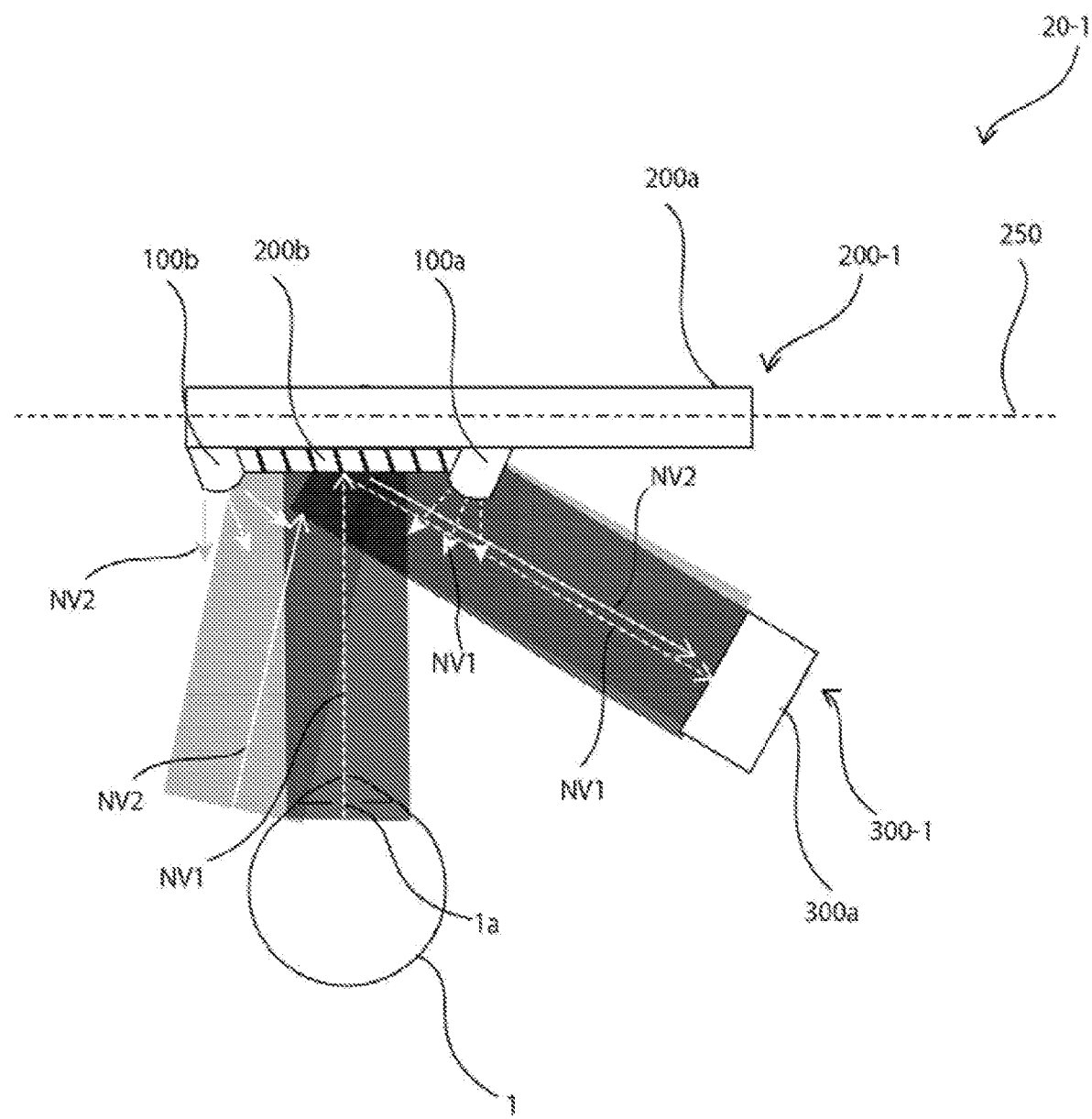

[FIG. 7]
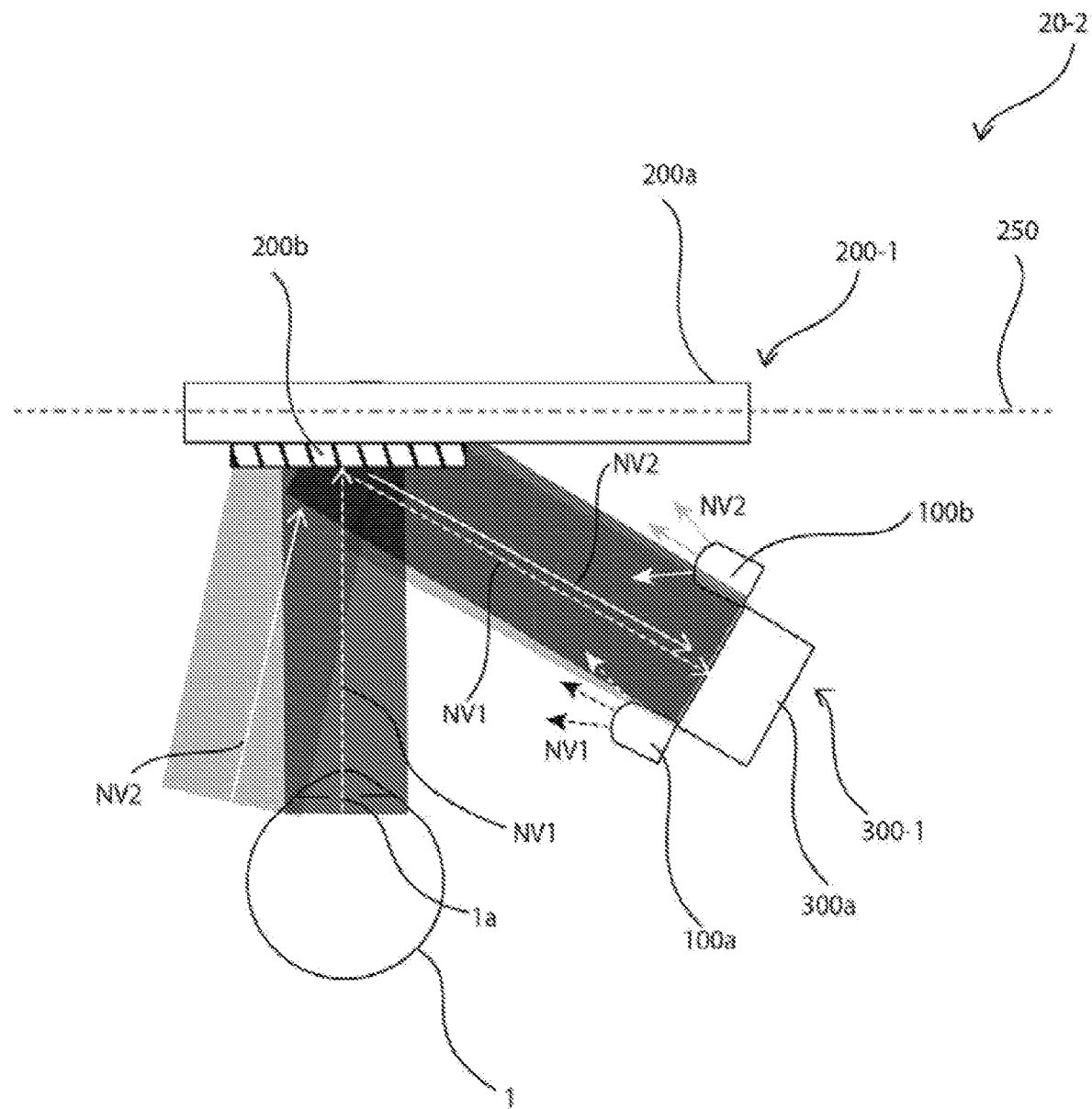

[ FIG. 8 ]
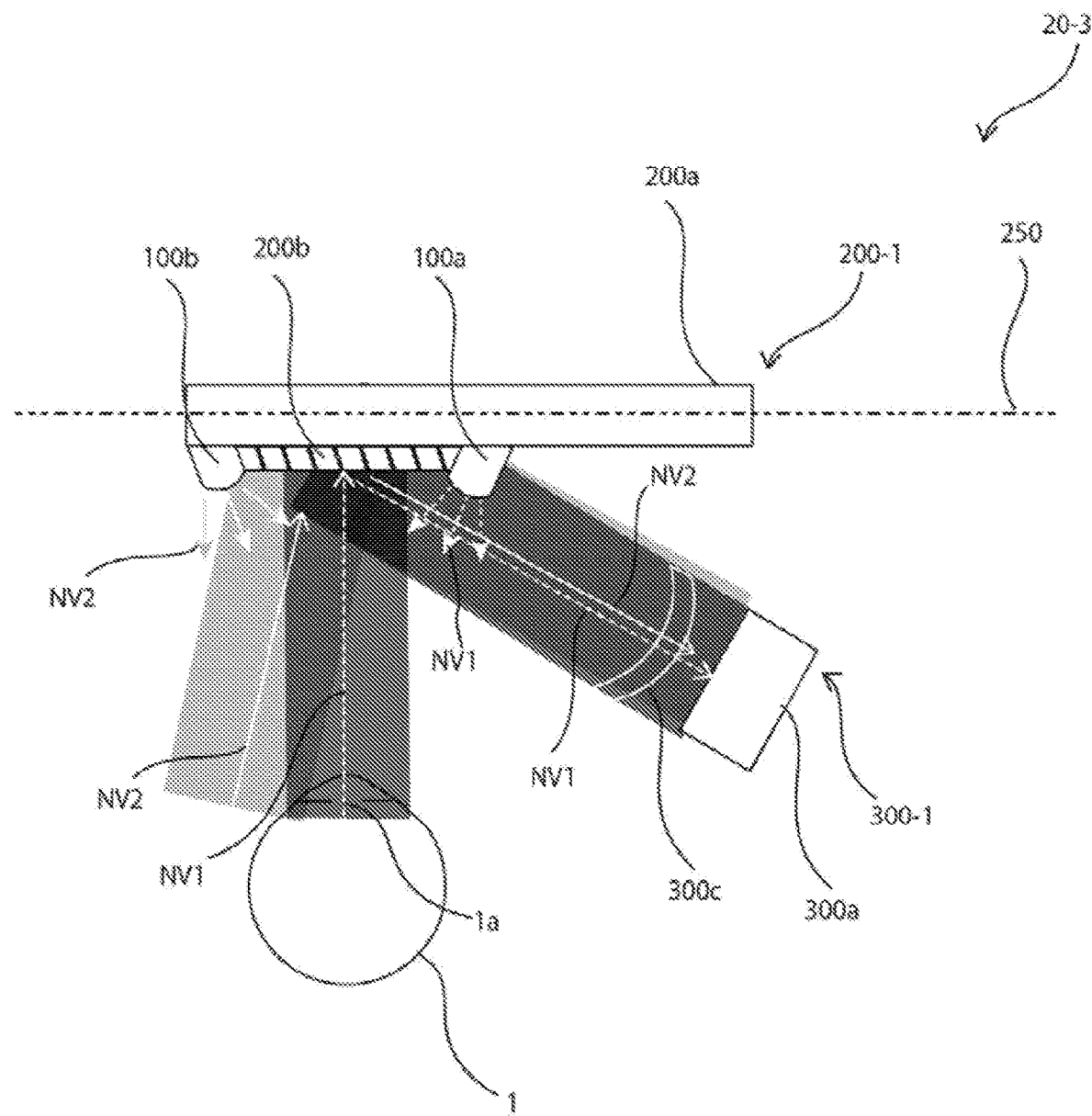

[FIG. 9]
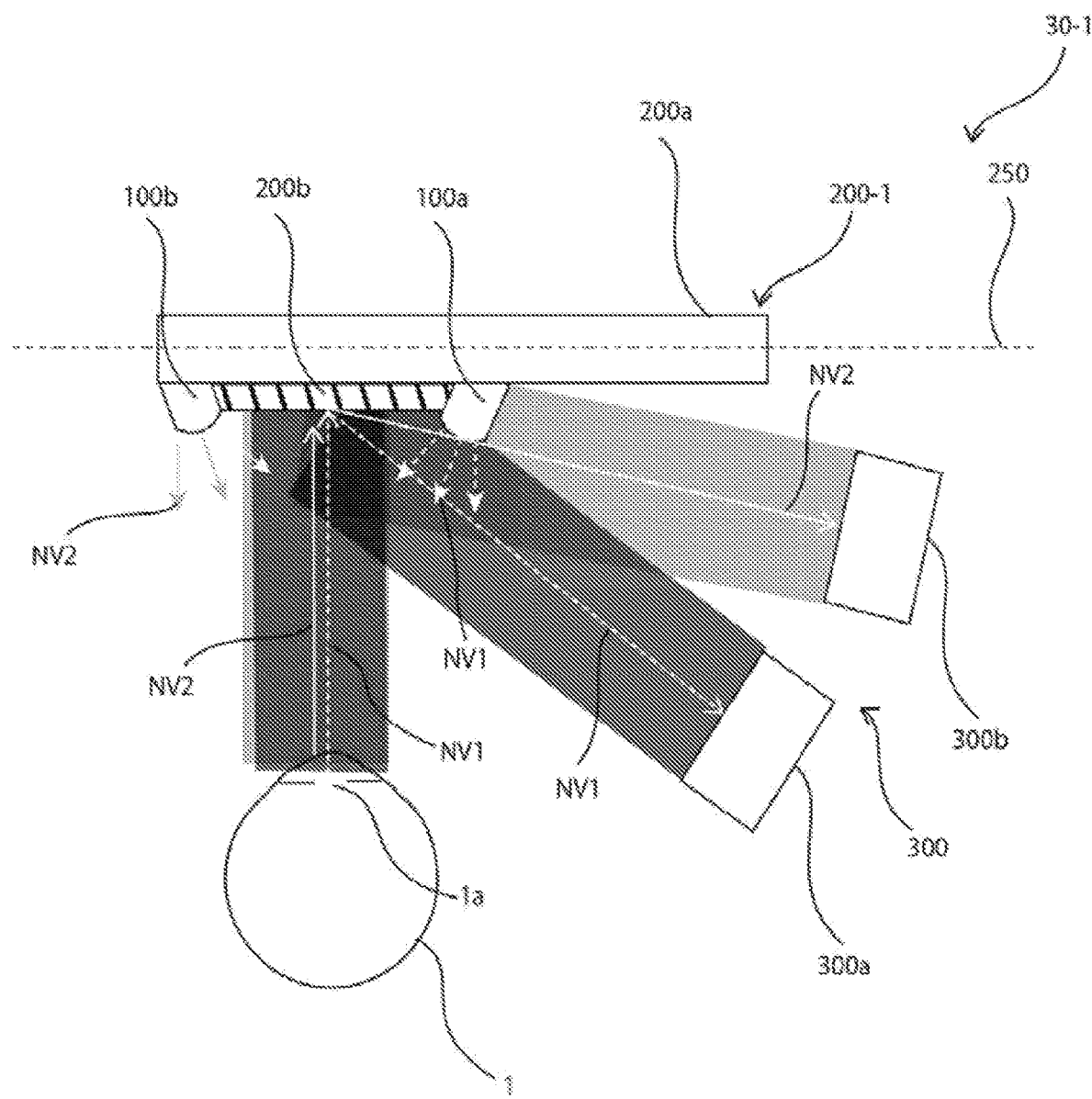

[ FIG. 10 ]
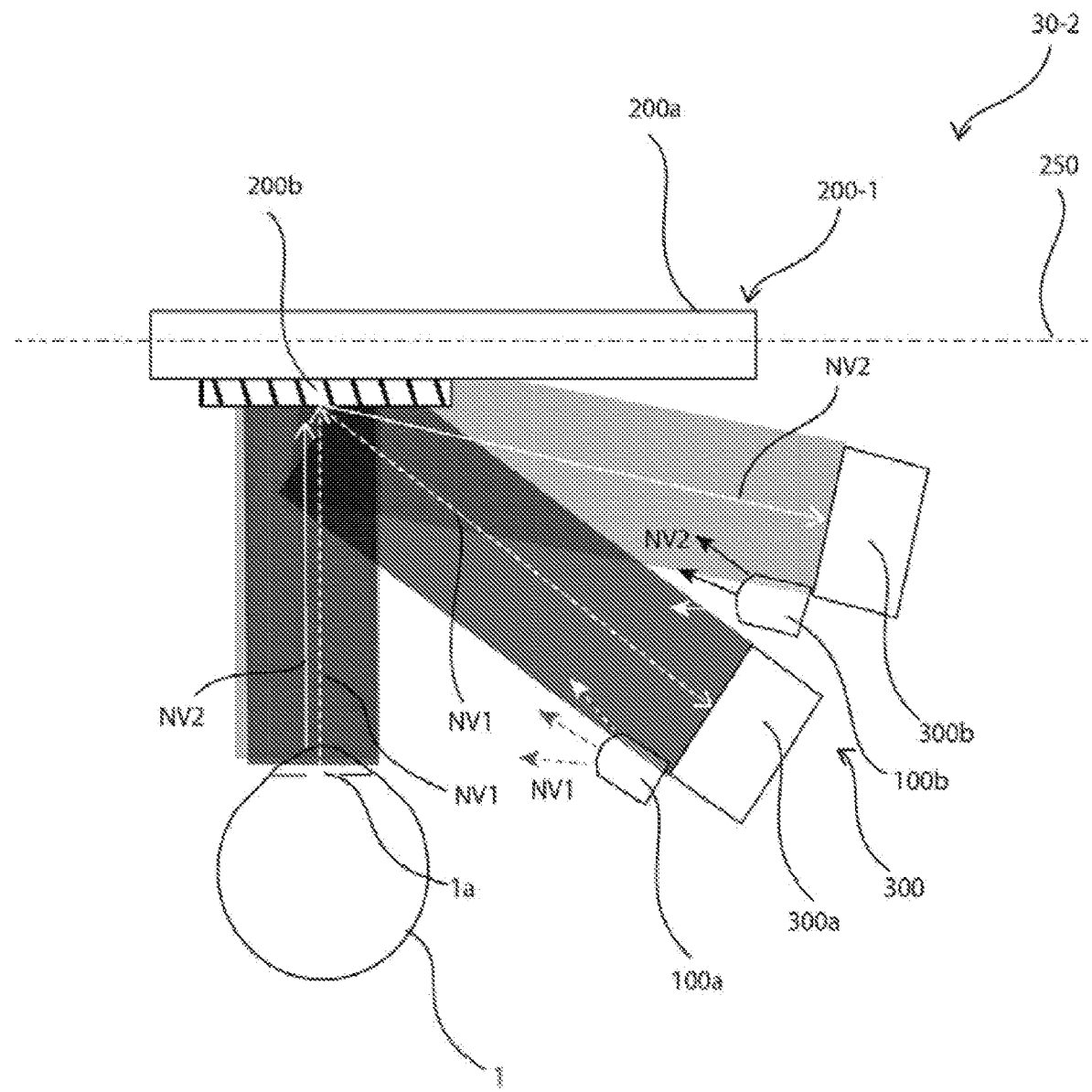

[FIG. 11]
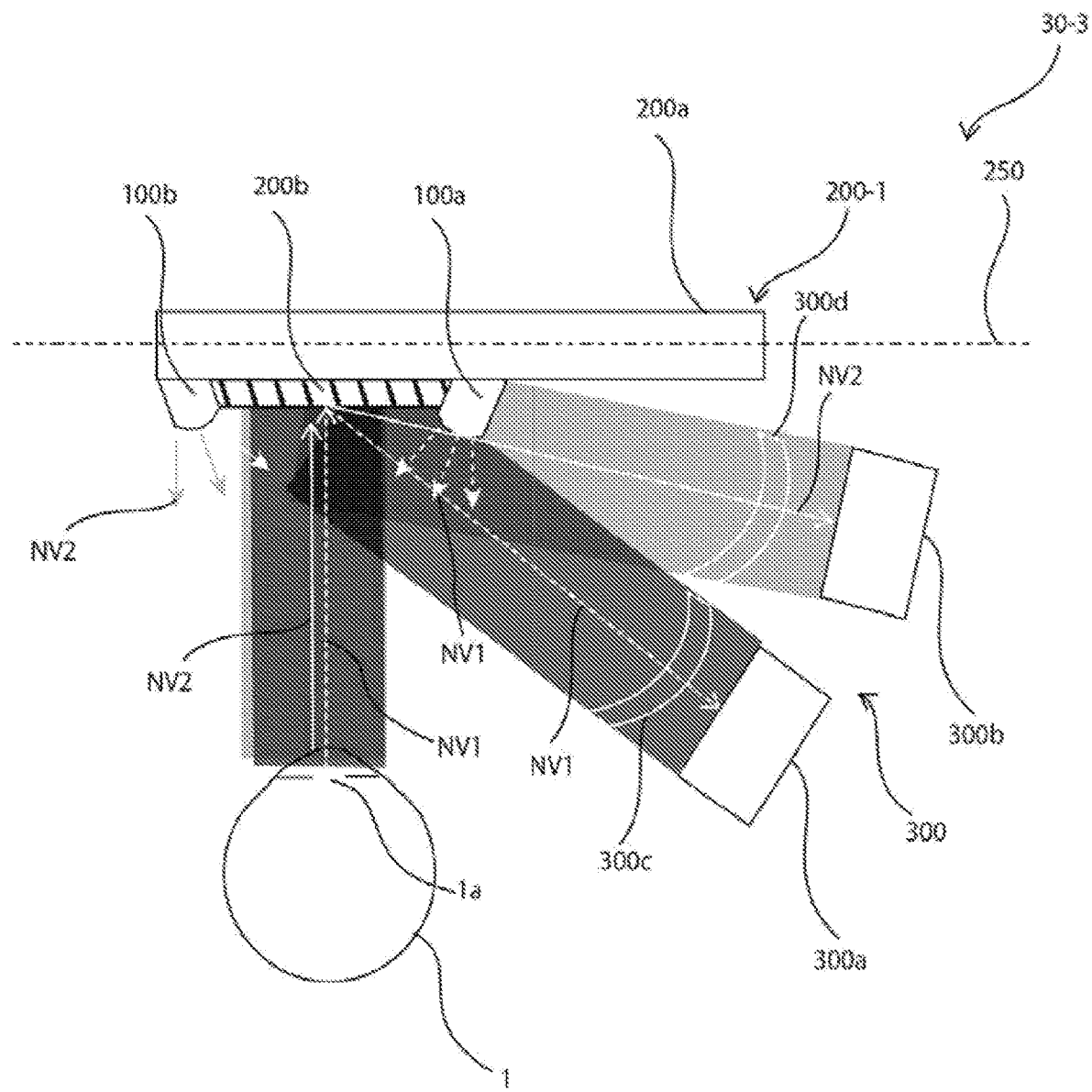

[ FIG. 12 ]
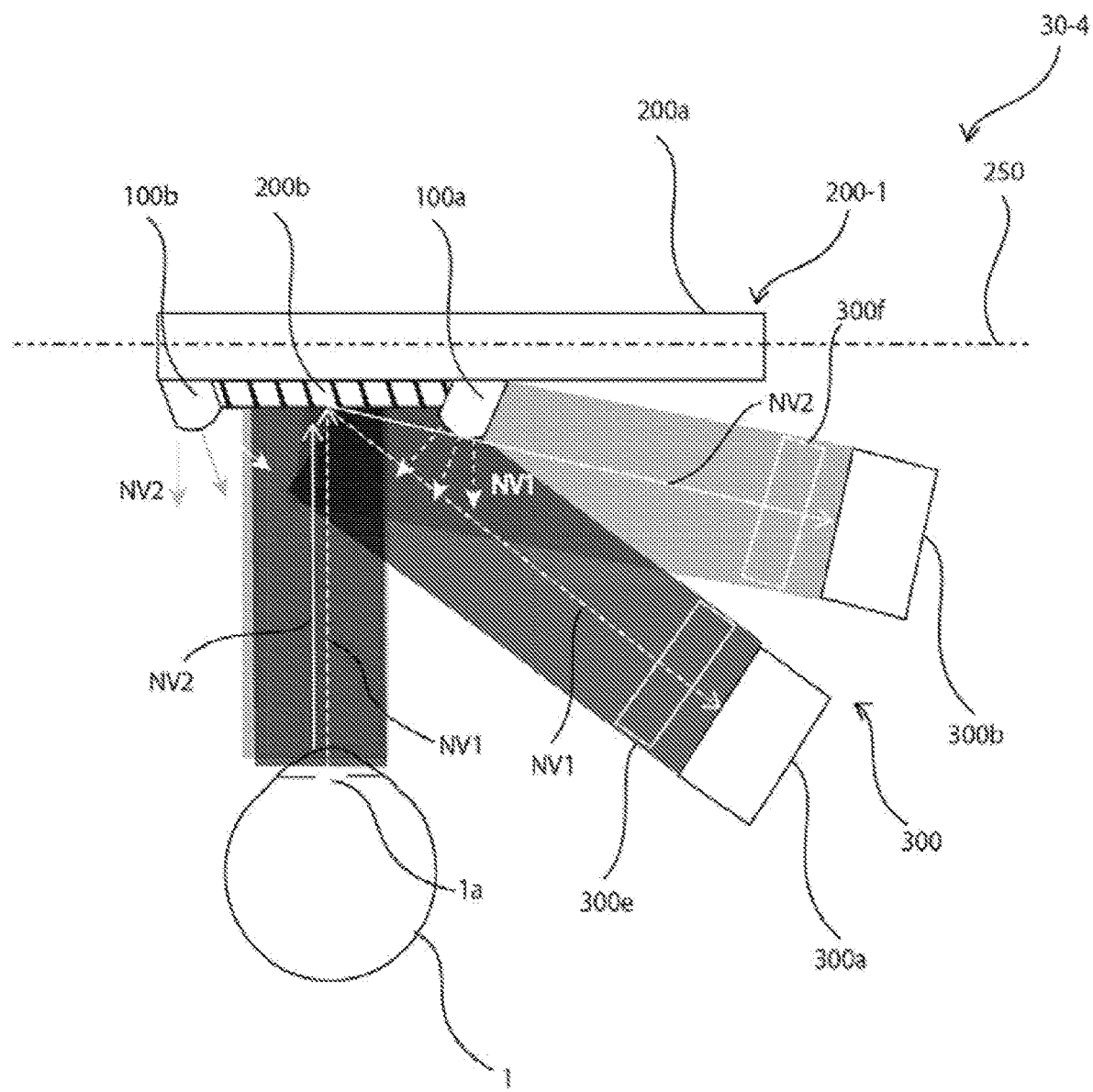

[FIG. 13]
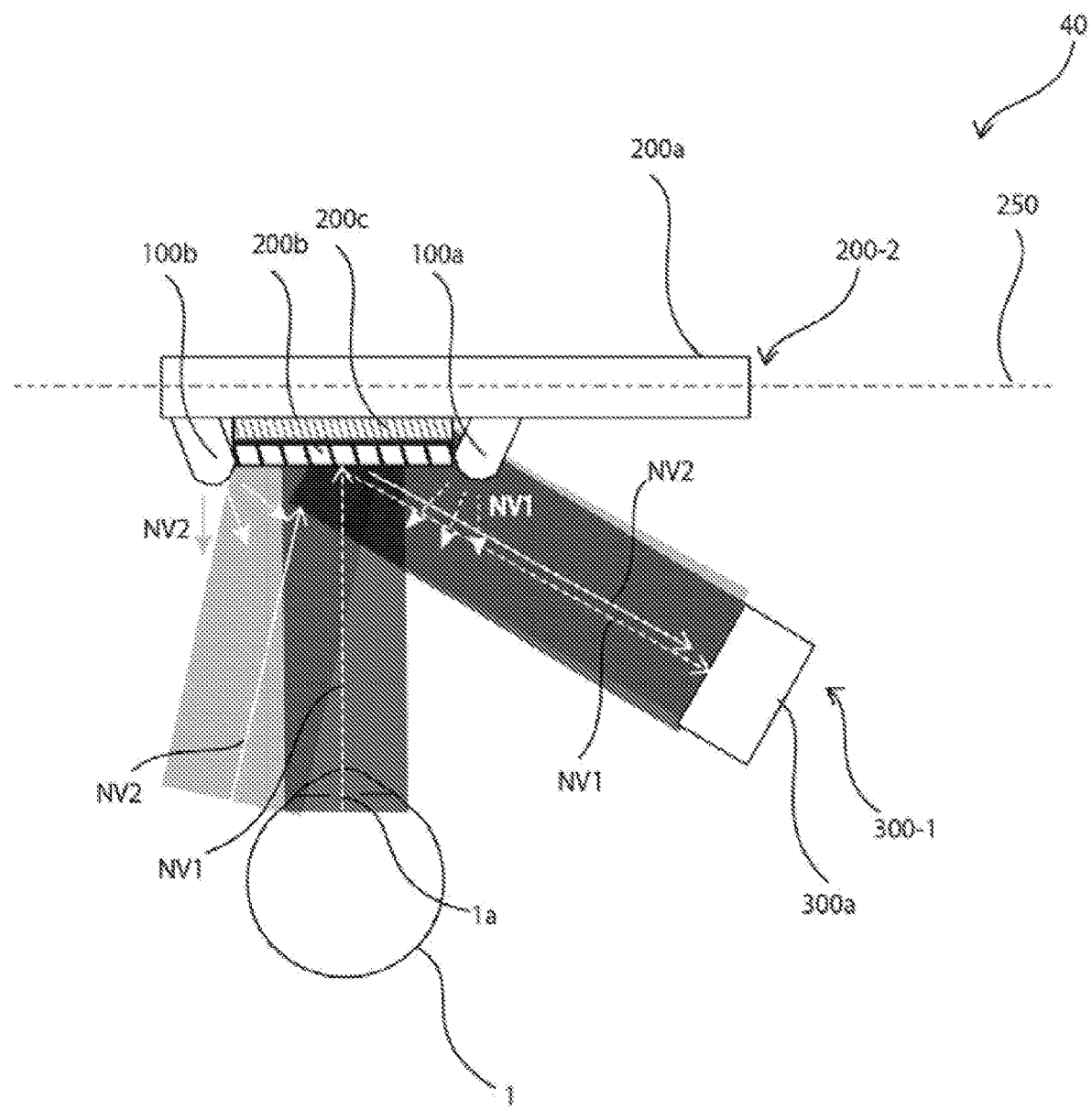

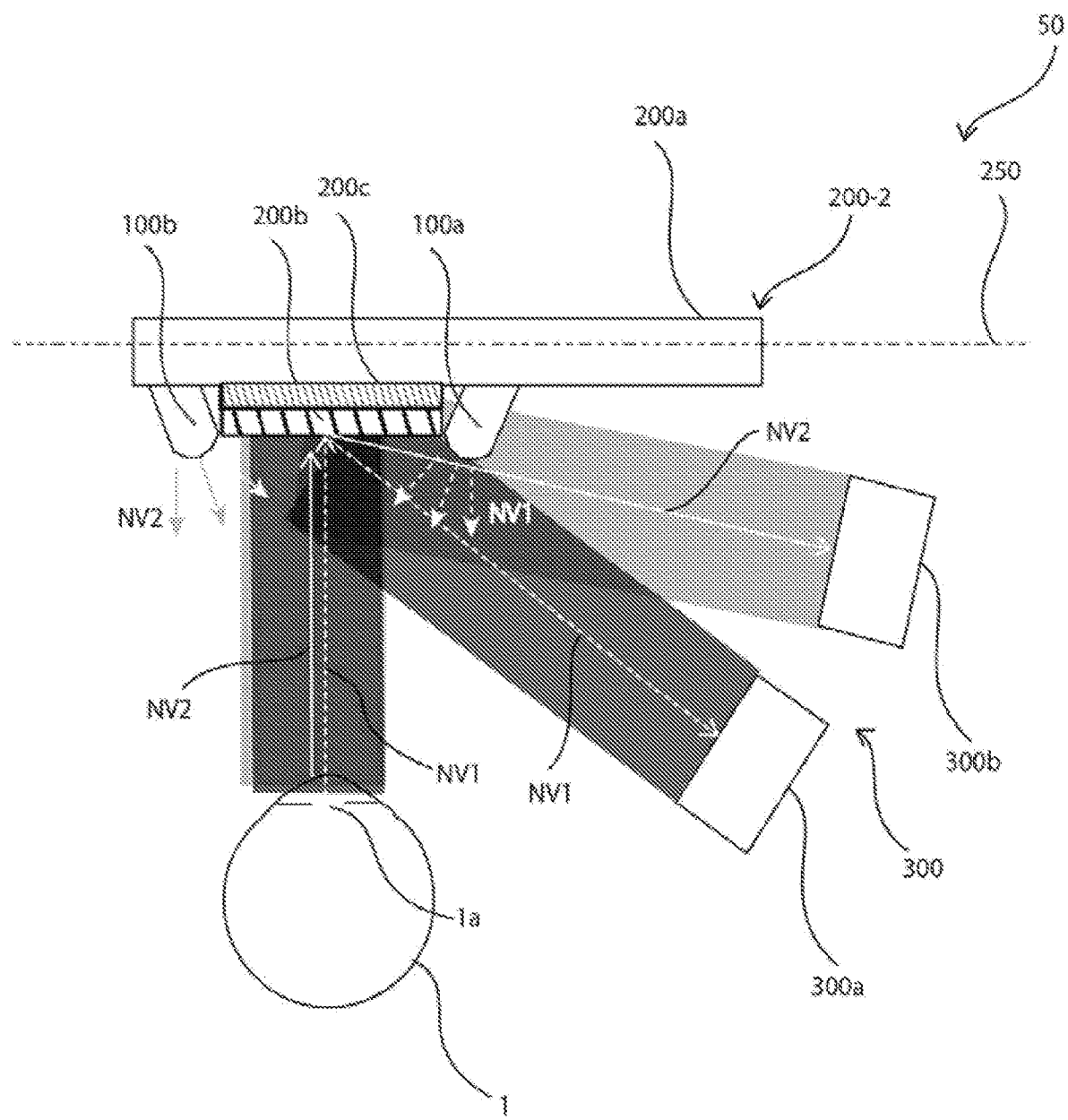
[FIG. 14]

[ FIG. 15 ]
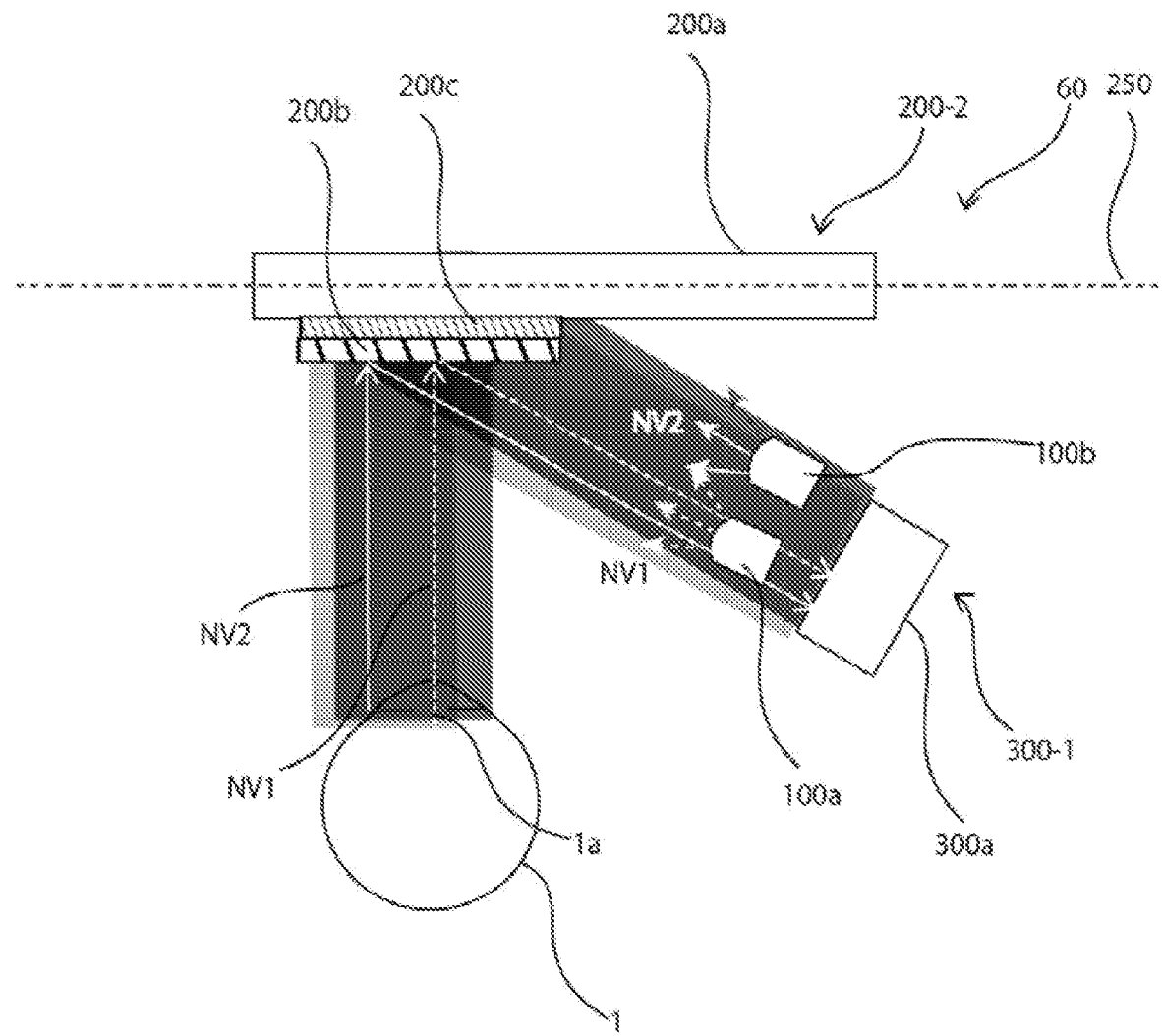

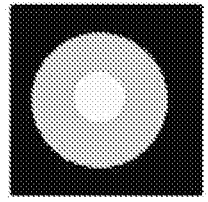
[FIG. 16A]
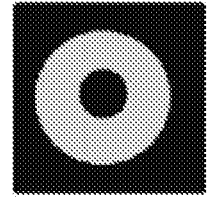
[FIG. 16B]
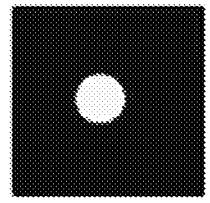
[FIG. 16C]

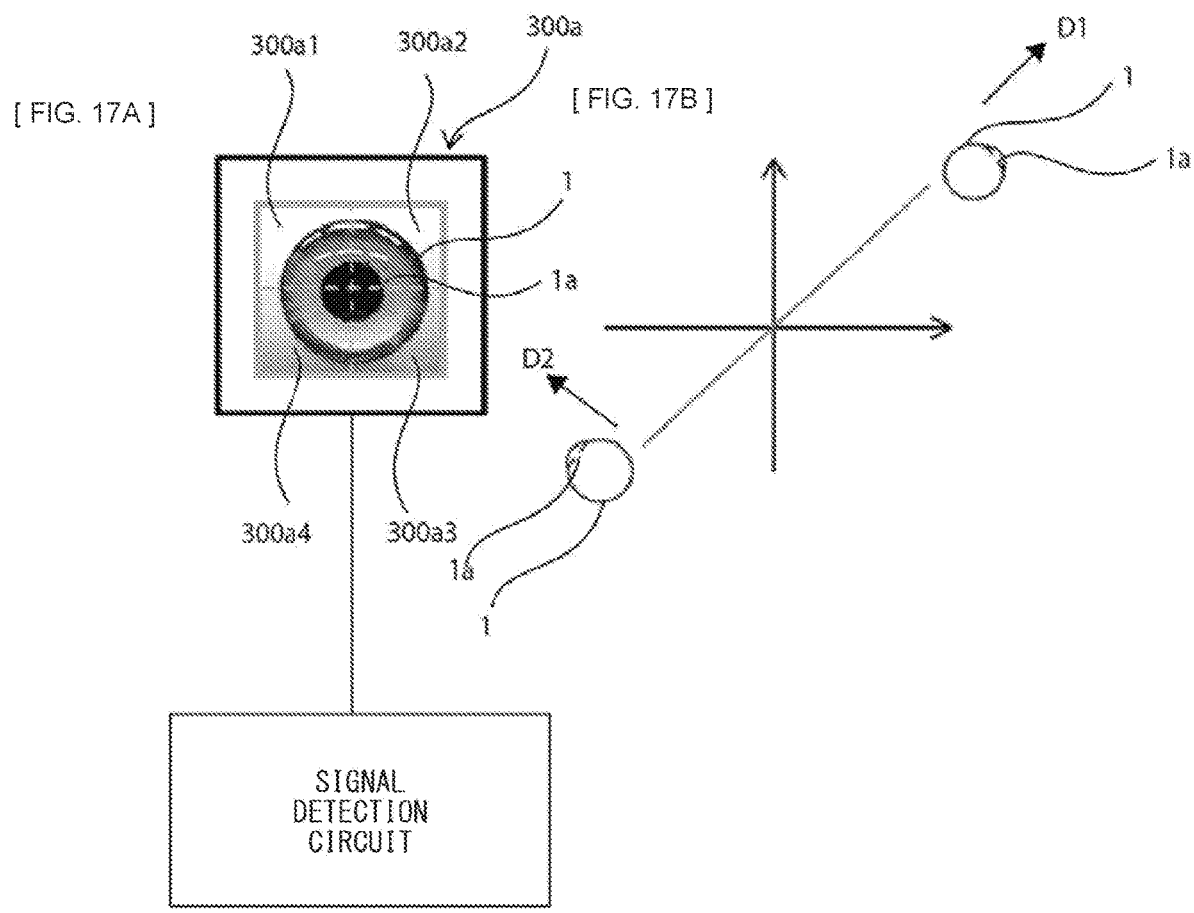

[FIG. 18A]
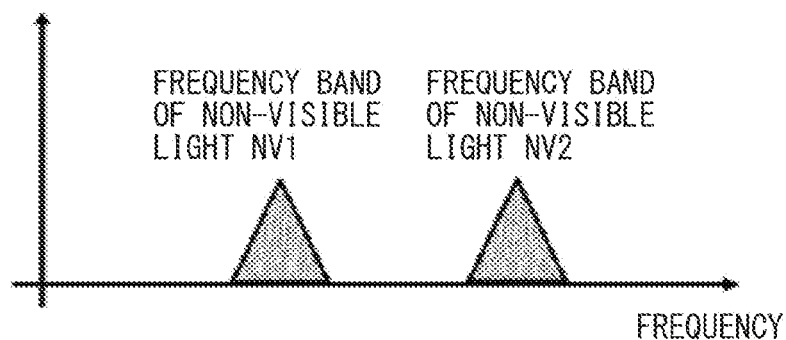
[FIG. 18B]
LIGHT EMISSION PATTERN
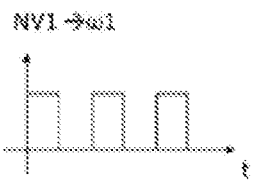
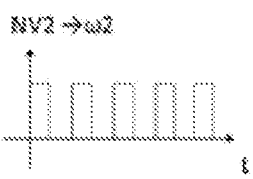
[FIG. 18C]
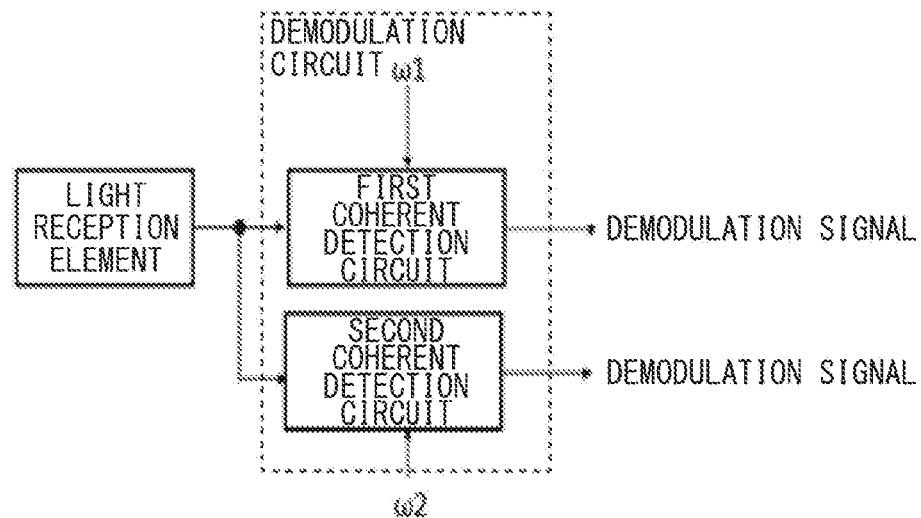

[ FIG. 19 ]
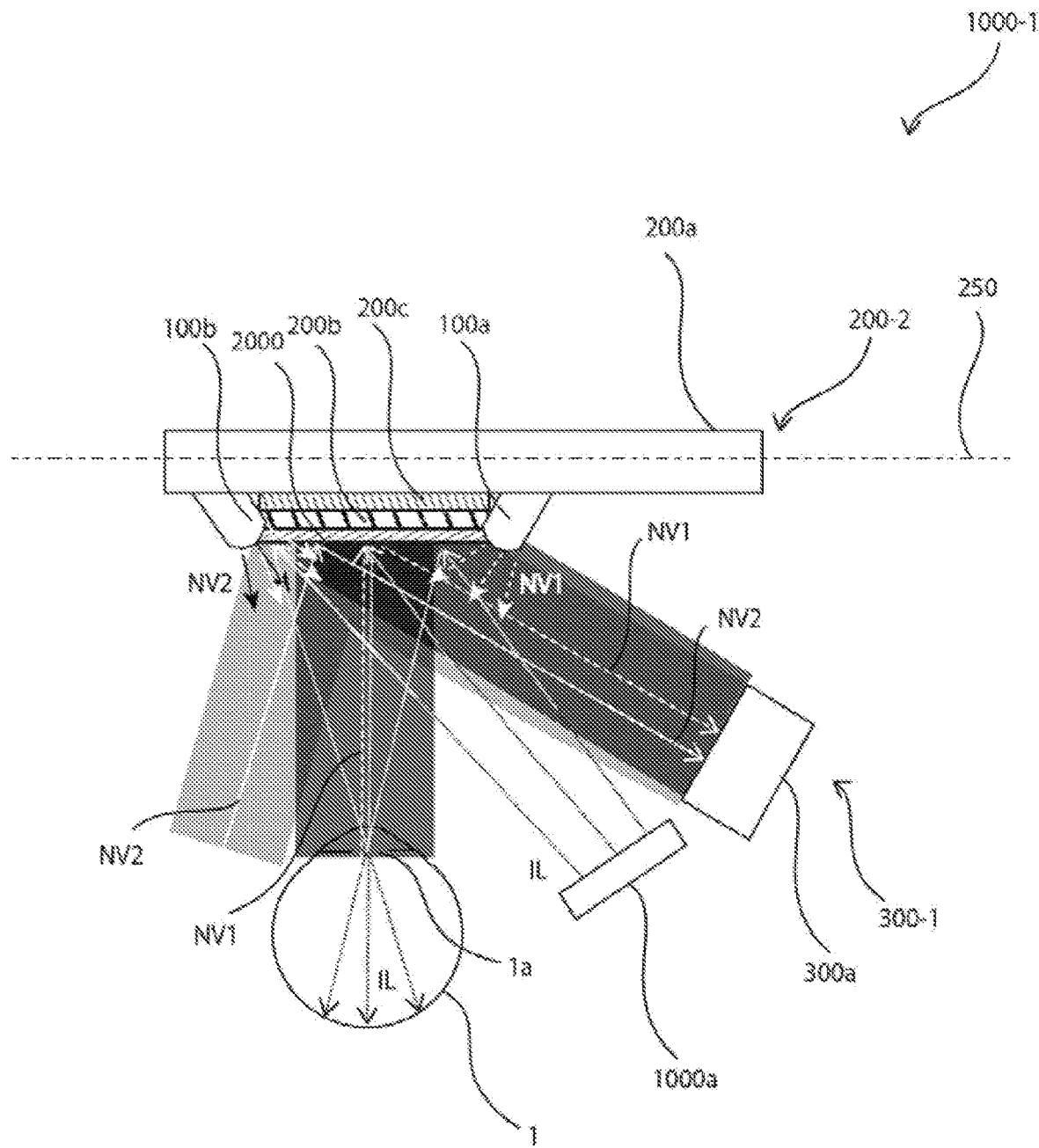

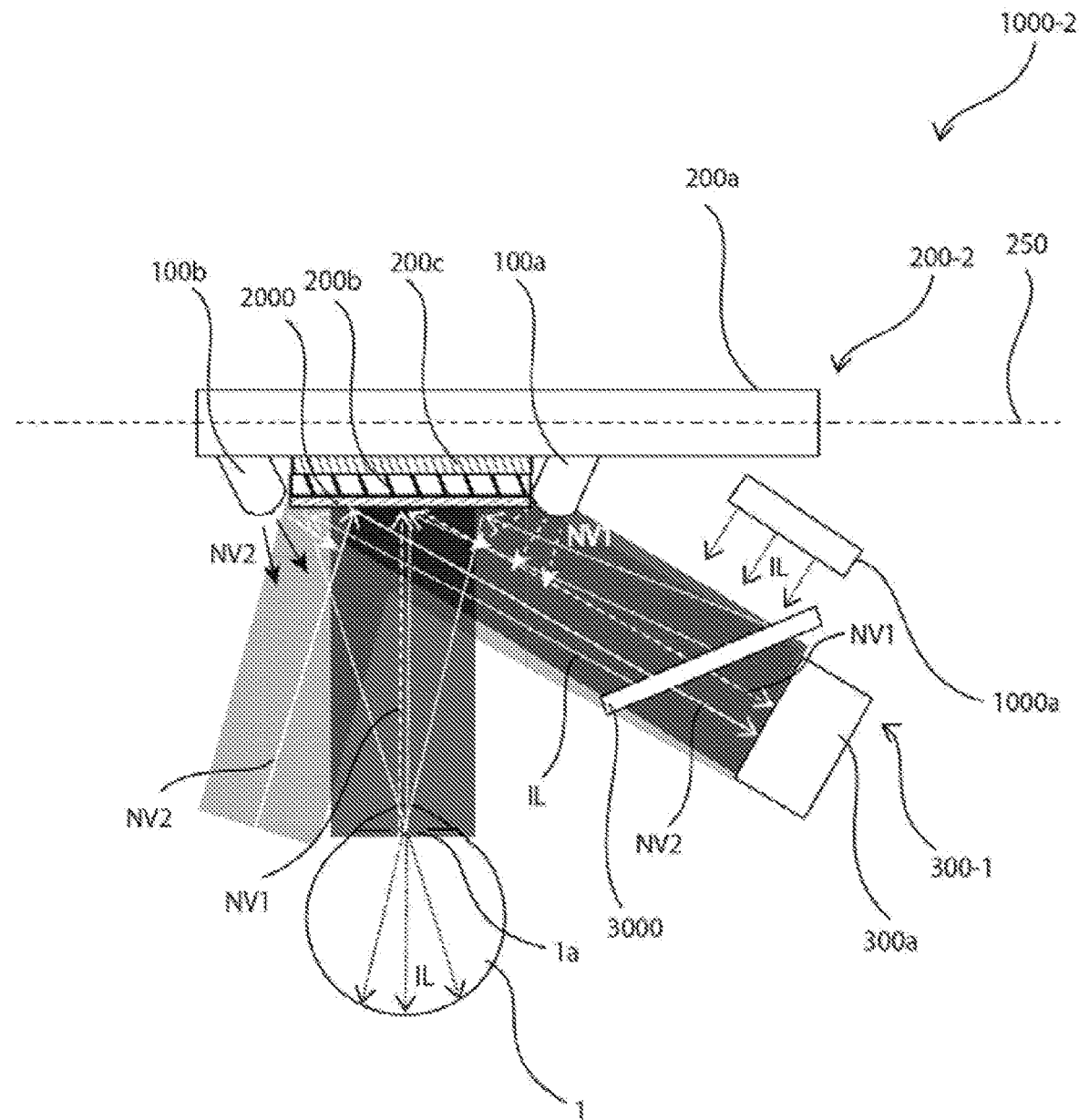
[FIG. 20]

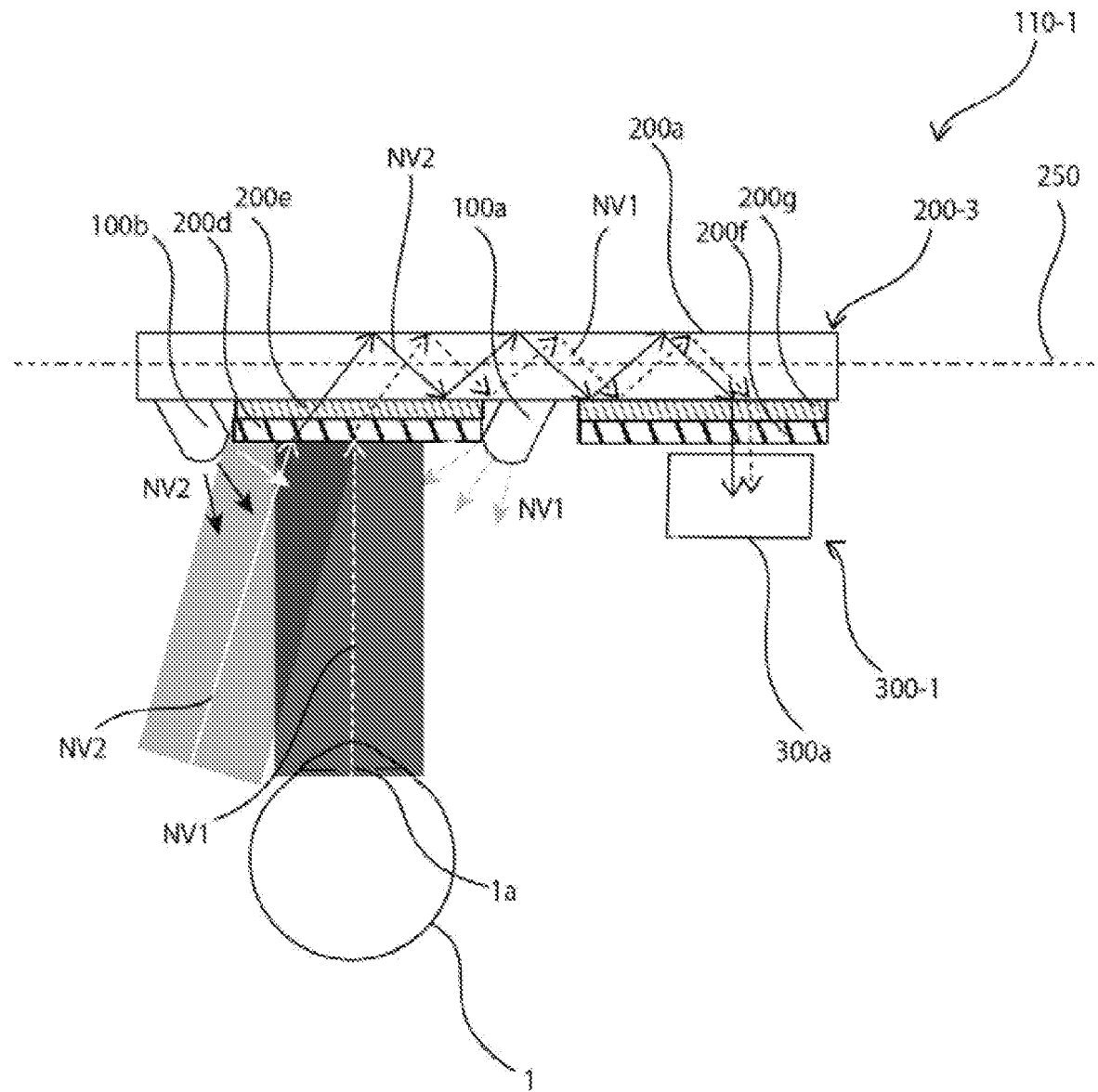
[FIG. 21]

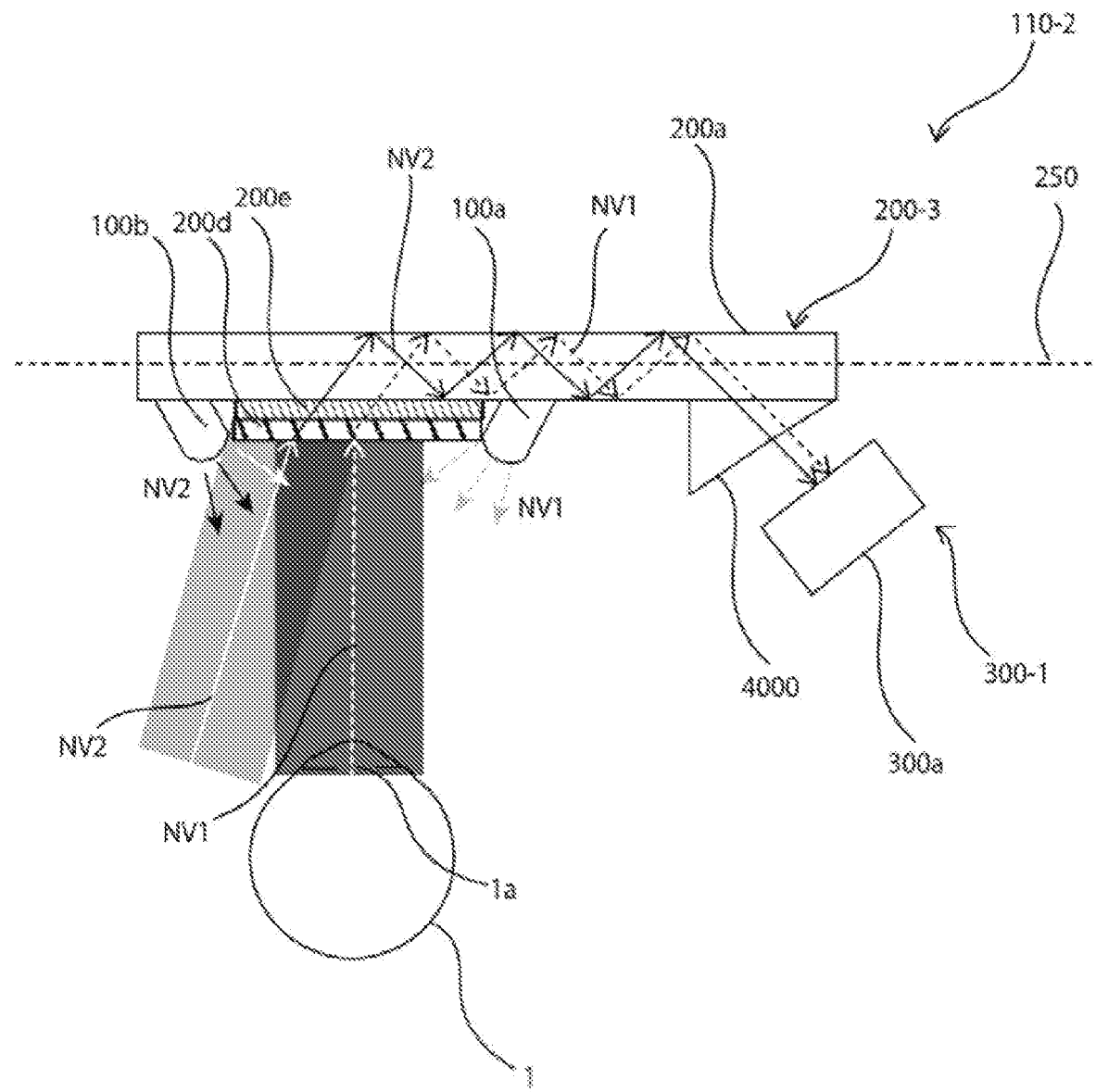
[FIG. 22]

[FIG. 23]
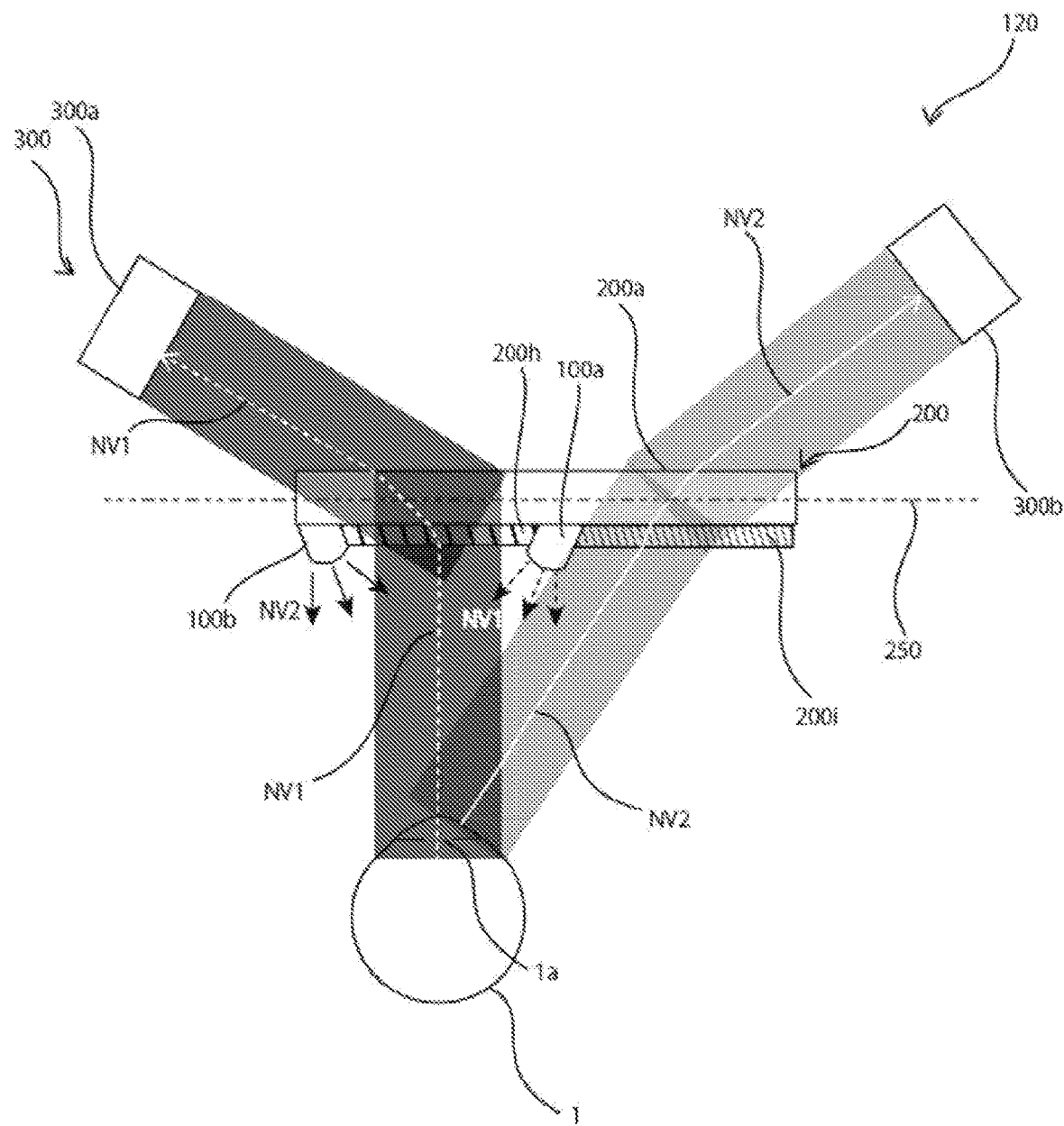

[ FIG. 24A ]
LIGHT EMISSION PATTERN
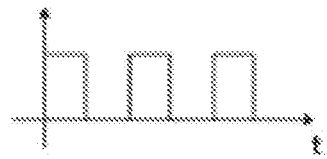
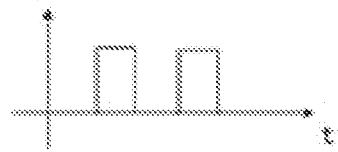
[ FIG. 24B ]
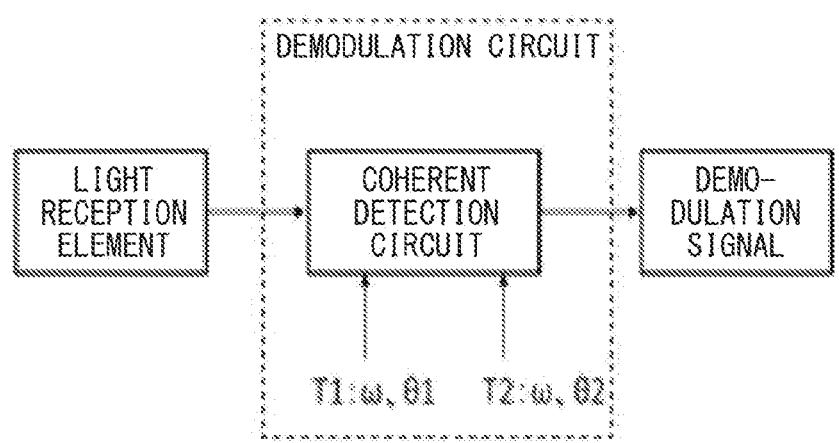

EYE INFORMATION DETECTION DEVICE AND IMAGE DISPLAY APPARATUS

CROSS REFERENCE TO RELATED APPLICATIONS

This application is a U.S. National Phase of International Patent Application No. PCT/JP2020/042245 filed on Nov. 12, 2020, which claims priority benefit of Japanese Patent Application No. JP 2019-222596 filed in the Japan Patent Office on Dec. 10, 2019. Each of the above-referenced applications is hereby incorporated herein by reference in its entirety.

TECHNICAL FIELD

The technology according to the present disclosure (hereinafter, also referred to as "the present technology") relates to an eye information detection device and an image display apparatus.

BACKGROUND ART

There has been known a technique of receiving reflected light from an eye to thereby detect position information of the eye.

For example, PTL 1 discloses a technique of reflecting reflected light from an eye by a display surface of an HMD (head-mounted display) and receiving it with an imager (an image sensor), to thereby detect information (e.g., position information) of the eye.

CITATION LIST

Patent Literature

PTL 1: Japanese Unexamined Patent Application Publication (Published Japanese Translation of PCT Application) No. JP2018-530781

SUMMARY OF THE INVENTION

Problem to be Solved by the Invention

However, the technique disclosed in PTL 1 still has room for improvement in terms of highly accurate detection of eye information.

To address this, it is a main object of the present technology to provide an eye information detection device that is able to detect eye information with high accuracy and an image display apparatus including the eye information detection device.

Means for Solving the Problem

The present technology provides
an eye information detection device including:
two or more non-visible light sources having different light emission wavelengths;
a diffractive optical element disposed on an optical path of non-visible light emitted from each of the two or more non-visible light sources and reflected by an eye; and
a light reception system that receives the non-visible light reflected by the eye and passing through the diffractive optical element.

The light reception system may be disposed on the eye side of a plane including an in-plane direction of the diffractive optical element.

The light reception system may be disposed on the opposite side to the eye side of the plane including the in-plane direction of the diffractive optical element.

The diffractive optical element may diffract, toward the light reception system, the non-visible light reflected by the eye.

The diffractive optical element may include a diffraction portion that diffracts each of the two or more rays of non-visible light in a direction based on a wavelength thereof.

The light reception system may include a light reception element. The two or more rays of non-visible light reflected by the eye in different directions and diffracted by the diffractive optical element in the same direction may be caused to enter the light reception element.

The light reception system may include two or more light reception elements. The two or more rays of non-visible light reflected by the eye in the same direction and diffracted by the diffractive optical element in different directions may be caused to individually enter the two or more respective light reception elements.

The diffractive optical element may include two or more diffraction portions that each individually correspond to a wavelength of one of the two or more rays of non-visible light and each diffract the non-visible light having a corresponding wavelength in a direction based on the wavelength.

The two or more diffraction portions may be disposed at different positions in the in-plane direction of the diffractive optical element.

The light reception system may include two or more light reception elements. The two or more rays of non-visible light reflected by the eye and diffracted by the two or more respective diffraction portions may individually enter the two or more respective light reception elements.

The two or more diffraction portions may be disposed at the same position in the in-plane direction of the diffractive optical element.

The light reception system may include a light reception element. The two or more rays of non-visible light reflected by the eye in different directions and diffracted by the two or more respective diffraction portions in the same direction may be caused to enter the light reception element.

The light reception system may include two or more light reception elements. The two or more rays of non-visible light reflected by the eye in the same direction and diffracted by the two or more respective diffraction portions in different directions may be caused to individually enter the two or more respective light reception elements.

The light reception system may include a light reception element. The two or more rays of non-visible light reflected by the eye in the same direction and diffracted by the two or more respective diffraction portions in the same direction may be caused to enter the light reception element.

The non-visible light emitted from each of the two or more non-visible light sources toward the eye and reflected by the eye may be caused to enter the diffractive optical element.

The non-visible light emitted from each of the two or more non-visible light sources toward the diffractive optical element and diffracted by the diffractive optical element may be caused to enter the eye.

The two or more non-visible light sources may perform light emission at different timings.

The light reception system may include two or more light reception elements and a bandpass filter. The two or more light reception elements may correspond to the two or more respective non-visible light sources. The bandpass filter may be disposed on an optical path of the non-visible light between the diffractive optical element and each of the two or more light reception elements and allow the non-visible light to pass therethrough.

The light reception system may include at least one light emission element including two or more light reception regions disposed two-dimensionally. The signal detection circuit that detects a signal outputted from each of the two or more light reception regions may be further provided.

The number of the light reception regions may be 4.

The light reception element may include two or more light reception elements.

The two or more light reception elements may differ from each other in the number of the light reception regions.

The two or more rays of non-visible light may have different frequencies. The signal detection circuit may detect a signal outputted from the light reception element when each of the two or more rays of non-visible light is received by the light reception element, on the basis of the frequency of the non-visible light.

The two or more rays of non-visible light may perform light emission in opposite phases. The signal detection circuit may detect a signal outputted from the light reception element when each of the two or more rays of non-visible light is received by the light reception element, on the basis of a phase of the non-visible light.

The light reception system may include a light reception element and a toroidal lens. The toroidal lens may be disposed on an optical path of the non-visible light between the diffractive optical element and the light reception element.

The light reception system may include a light reception element. The two or more non-visible light sources may include a first non-visible light source and a second non-visible light source. The first non-visible light source may emit first non-visible light having a center wavelength in a range from 700 nm to 900 nm. The second non-visible light source may emit second non-visible light having a center wavelength in a range from 900 nm to 1000 nm. The diffractive optical element may diffract, toward the light reception element, the first non-visible light and the second non-visible light reflected by the eye in the same direction.

A substrate on which the diffractive optical element is provided may be further provided. The light reception system may be provided on the eye side of the substrate. The diffractive optical element may cause the non-visible light reflected by the eye to enter inside the substrate, propagate inside the substrate, and exit toward the light reception system.

The diffractive optical element may include a first transmission diffraction section and a second transmission diffraction section. The first transmission diffraction section may be provided on a surface of the substrate on the eye side. The first transmission diffraction section may transmit and diffract the non-visible light reflected by the eye, in a direction satisfying a total reflection condition inside the substrate. The second transmission diffraction section may transmit and diffract, toward the light reception system, the non-visible light propagating while being totally reflected inside the substrate.

The eye information detection device may be of a head-mounted type.

The present technology also provides an image display apparatus including the eye information detection device.

The image display apparatus may further include an image light projection unit and another diffractive optical element. The image light projection unit may project image light. The other diffractive optical element may be provided in the diffractive optical element of the eye information detection device and diffract the image light from the image light projection unit toward the eye.

The reception system of the eye information detection device may include a light reception element, and be disposed between the other diffractive optical element and the light reception element. The image display apparatus may further include a beam splitter. The beam splitter may reflect, toward the other diffractive optical element, a portion of the image light projected from the image light projection unit, and allow another portion thereof to pass therethrough.

The image light projection unit may be disposed on the opposite side to the eye side of the beam splitter.

BRIEF DESCRIPTION OF DRAWINGS

FIG. 1 is a schematic cross-sectional view of a configuration of an eye information detection device according to Example 1 of a first embodiment of the present technology.

FIG. 2 is a graph illustrating an example of a spectral characteristic of diffraction efficiency of non-visible light FIG. 3 is a schematic cross-sectional view of a configuration of an eye information detection device according to Example 2 of the first embodiment of the present technology.

FIG. 4 is a schematic cross-sectional view of a configuration of an eye information detection device according to Example 3 of the first embodiment of the present technology.

FIG. 5 is a schematic cross-sectional view of a configuration of an eye information detection device according to Example 4 of the first embodiment of the present technology.

FIG. 6 is a schematic cross-sectional view of a configuration of an eye information detection device according to Example 1 of a second embodiment of the present technology.

FIG. 7 is a schematic cross-sectional view of a configuration of an eye information detection device according to Example 2 of the second embodiment of the present technology.

FIG. 8 is a schematic cross-sectional view of a configuration of an eye information detection device according to Example 3 of the second embodiment of the present technology.

FIG. 9 is a schematic cross-sectional view of a configuration of an eye information detection device according to Example 1 of a third embodiment of the present technology.

FIG. 10 is a schematic cross-sectional view of a configuration of an eye information detection device according to Example 2 of the third embodiment of the present technology.

FIG. 11 is a schematic cross-sectional view of a configuration of an eye information detection device according to Example 3 of the third embodiment of the present technology.

FIG. 12 is a schematic cross-sectional view of a configuration of an eye information detection device according to Example 4 of the third embodiment of the present technology.

FIG. 13 is a schematic cross-sectional view of a configuration of an eye information detection device according to a fourth embodiment of the present technology.

FIG. 14 is a schematic cross-sectional view of a configuration of an eye information detection device according to a fifth embodiment of the present technology.

FIG. 15 is a schematic cross-sectional view of a configuration of an eye information detection device according to a sixth embodiment of the present technology.

FIGS. 16A, 16B, and 16C are each a diagram illustrating an example of light amount distribution for each reflected light from an eye of the eye information detection device according to the sixth embodiment of the present technology.

FIG. 17A is a diagram illustrating a configuration example of a light reception element of an eye information detection device according to a seventh embodiment of the present technology. FIG. 17B is a diagram for describing a method of detecting an orientation of the eye.

FIGS. 18A, 18B, and 18C are each a diagram for describing a light emission control and signal detection for two or more non-visible light sources of an eye information detection device according to an eighth embodiment of the present technology.

FIG. 19 is a schematic cross-sectional view of a configuration of an image display apparatus according to Example 1 of a tenth embodiment of the present technology.

FIG. 20 is a schematic cross-sectional view of a configuration of an image display apparatus according to Example 2 of the tenth embodiment of the present technology.

FIG. 21 is a schematic cross-sectional view of a configuration of an eye information detection device according to Example 1 of an eleventh embodiment of the present technology.

FIG. 22 is a schematic cross-sectional view of a configuration of an eye information detection device according to Example 2 of the eleventh embodiment of the present technology.

FIG. 23 is a schematic cross-sectional view of a configuration of an eye information detection device according to a twelfth embodiment of the present technology.

FIGS. 24A and 24B are each a diagram for describing a light emission control and signal detection for two or more non-visible light sources of an eye information detection device according to a ninth embodiment of the present technology.

MODES FOR CARRYING OUT THE INVENTION

A description is given below of preferred embodiments of the present technology in detail with reference to the accompanying drawings. It is to be noted that, in this specification and the drawings, components that have substantially the same functional configuration are denoted with the same reference numeral to thereby omitting duplicate descriptions. The embodiments described below are illustrative of representative embodiments of the present technology and are not to be construed as limiting the scope of the present technology. In this specification, even in a case where it is described that each of an eye information detection device and an image display apparatus according to the present technology exhibits a plurality of effects, it is sufficient that each of the eye information detection device and the image display apparatus according to the present technology exhibits at least one effect. The effects described herein are merely illustrative and non-limiting. Moreover, any other effect may be provided.

In addition, the description is given in the following order.
1. Introduction
2. Eye Information Detection Device According to First Embodiment of Present Technology
3. Eye Information Detection Device According to Second Embodiment of Present Technology
4. Eye Information Detection Device According to Third Embodiment of Present Technology
5. Eye Information Detection Device According to Fourth Embodiment of Present Technology
6. Eye Information Detection Device According to Fifth Embodiment of Present Technology
7. Eye Information Detection Device According to Sixth Embodiment of Present Technology
8. Eye Information Detection Device According to Seventh Embodiment of Present Technology
9. Eye Information Detection Device According to Eighth Embodiment of Present Technology
10. Eye Information Detection Device According to Ninth Embodiment of Present Technology
11. Image Display Apparatus According to Tenth Embodiment of Present Technology
12. Eye Information Detection Device According to Eleventh Embodiment of Present Technology
13. Eye Information Detection Device According to Twelfth Embodiment of Present Technology 1. <Introduction>

It has been expected to apply sensing of eye information (eye information detection) to various fields.

For example, it is expected to use the eye information detection: for neuroscience, biotechnology, medicine, etc. in the field of research; for technique transmission based on eye tracking, for improvement of usability of a UI (user interface), etc. in the field of industry; and for development in security by iris authentication.

In a head-mounted display HMD which has recently been causing intense competition, the eye information detection is used, for example, in foveated rendering (Foveated Rendering) and enlarging eye box (eye box). The HMD displays images of augmented reality (AR) and virtual reality (VR) to the user.

2. <Eye Information Detection Device According to First Embodiment of Present Technology>

A description is given of an eye information detection device 10 according to a first embodiment of the present technology (eye information detection devices 10-1 to 10-4 of Examples 1 to 4) with reference to the drawings.

The eye information detection device 10 is mounted, for example, on an HMD (head-mounted display) to be worn on a user's head. The HMD is also called an eyewear, for example.

That is, the eye information detection device 10 is of a head-mounted type.

The information of an eye (eye information) to be detected by the eye information detection device 10 includes, for example, an orientation of an eye (a line of sight), a size of a pupil of the eye, an iris of the eye, and the like.

(Configuration of Eye Information Detection Device of Example 1 of First Embodiment)

FIG. 1 is a schematic cross-sectional view of a configuration of an eye information detection device 10-1 of Example 1 of the first embodiment. The following description is based on the assumption that the eye information detection device 10-1 is mounted on the user's head.

As illustrated in FIG. 1, the eye information detection device 10-1 includes two or more (e.g., two) non-visible light sources 100a and 100b, a diffractive optical element 200, and a light reception system 300.

[Non-Visible Light Source]

The two non-visible light sources 100a and 100b differ from each other in light emission wavelength.

In one example, the two non-visible light sources 100a and 100b emit two respective rays of non-visible light NV1 and NV2 having wavelength bands different from each other. In one example, the respective wavelength bands of the two rays of non-visible light NV1 and NV2 have no overlapping portion.

The light emission wavelength of the non-visible light source 100a is, for example, a center wavelength of the wavelength band of the non-visible light NV1. The light emission wavelength of the non-visible light source 100b is, for example, a center wavelength of the wavelength band of the non-visible light NV2.

Each non-visible light is, for example, infrared light such as near-infrared light, mid-infrared light, or far-infrared light.

In FIG. 1, etc., the non-visible light NV1 is indicated by a broken-line arrow, and the non-visible light NV2 is indicated by a solid-line arrow.

In one example, each of the two non-visible light sources 100a and 100b is supported by the diffractive optical element 200 in such a manner that each of the two non-visible light sources 100a and 100b is able to apply light toward an eye 1.

Each non-visible light source includes, for example, a laser such as an LD (edge-emitting laser) or a VCSEL (surface-emitting laser), an LED (light-emitting diode), or the like.

[Diffractive Optical Element]

The diffractive optical element 200 is disposed on an optical path of the non-visible light emitted from each of the two non-visible light sources 100a and 100b and reflected by the eye 1.

The diffractive optical element 200 transmits at least a portion of incident environmental light (for example, it is natural light such as sunlight, artificial light such as illumination light, or the like, and this applies hereinafter). Therefore, it is possible for the user of the HMD to visually recognize a real scene with use of the diffractive optical element 200.

In more detail, the diffractive optical element 200 includes a combiner 200a (e.g., a glass plate) and two or more diffraction portions 200b and 200c. The combiner 200a is a substrate opposing the eye 1. The two or more diffraction portions 200b and 200c are provided on a surface of the combiner 200a on the eye 1 side. The combiner 200a transmits at least a portion of the incident environmental light. Note that the combiner is not essential in the diffractive optical element (this applies hereinafter). That is, the combiner is not necessarily a component of the diffractive optical element, but may be a component of the HMD, for example (this applies hereinafter).

In one example, each of the diffraction portions is a diffraction portion of a reflection type (a reflection diffraction portion).

That is, each of the diffraction portions reflects and diffracts light having a particular wavelength and transmits light having other wavelengths. Each of the diffraction portions transmits at least a portion of the incident environmental light.

The two or more diffraction portions 200b and 200c are disposed at different positions in an in-plane direction of the combiner 200a. The diffraction portion 200b is disposed in front of the eye 1, and the diffraction portion 200c is disposed in an oblique direction with respect to the eye 1.

In one example, the diffraction portion 200b reflects and diffracts the non-visible light NV1, emitted from the non-visible light source 100a and reflected by the eye 1 toward the front of the eye 1, in a direction based on its wavelength.

In one example, the diffraction portion 200c reflects and diffracts the non-visible light NV2, emitted from the non-visible light source 100b and reflected by the eye 1 in the above-described oblique direction, in a direction based on its wavelength.

As illustrated in FIG. 2, each of the diffraction portions is preferably the one having high diffraction efficiency in a wavelength range of the corresponding non-visible light (e.g., a wavelength range from 880 nm to 1000 nm both inclusive in a waveform having a peak of diffraction efficiency at the wavelength of 940 nm illustrated in FIG. 2) (the one made appropriate), and more preferably the one having the highest diffraction efficiency (the optimized one).

[Light Reception System]

The light reception system 300 is disposed on the eye 1 side of a plane 250 (indicated by a two-dot chain line in FIG. 1, etc.) including the in-plane direction of the diffractive optical element 200.

The light reception system 300 includes two or more (e.g., two) light reception elements 300a and 300b.

The light reception element 300a is disposed on an optical path of the non-visible light NV1 reflected by the eye 1 and reflected and diffracted by the diffraction portion 200b.

The light reception element 300b is disposed on an optical path of the non-visible light NV2 reflected by the eye 1 and reflected and diffracted by the diffraction portion 200c.

That is, the two or more rays of non-visible light NV1 and NV2 reflected by the eye 1 and reflected and diffracted by the two or more diffraction portions 200b and 200c individually enter the two light reception elements 300a and 300b, respectively.

As the light reception element 300a, it is preferable to use an element highly sensitive to the wavelength band of the corresponding non-visible light NV1.

As the light reception element 300b, it is preferable to use an element highly sensitive to the wavelength band of the corresponding non-visible light NV2.

Each of the light reception elements includes, for example, a PD (photodiode), a phototransistor, or the like.

For example, in the non-visible light NV1 entering the eye 1, the greater the proportion of light reflected at a position of a black portion of the eye 1 (a position with low reflectance) is, in other words, the smaller the proportion of light reflected at a position of a white portion of the eye 1 (a position with high reflectance) is, the smaller the amount of the light received by the light reception element 300a is.

For example, in the non-visible light NV2 entering the eye 1, the greater the proportion of light reflected at the position of the black portion of the eye 1 (having low reflectance) is, in other words, the smaller the proportion of light reflected at the position of the white portion of the eye 1 (the position with high reflectance) is, the smaller the amount of the light received by the light reception element 300b is.

Accordingly, for example, it is possible to detect the orientation of the eye 1 (the line of sight) with high accuracy on the basis of the amounts of light received by the two light reception elements 300a and 300b.

(Operation of Eye Information Detection Device of Example 1 of First Embodiment)

Operation of the eye information detection device 10-1 of Example 1 is described below with reference to FIG. 1.

The two non-visible light sources 100a and 100b are turned on at the same timing or sequentially (at different timings).

When the non-visible light source 100a is turned on, the non-visible light NV1 is emitted from the non-visible light source 100a toward the eye 1. At least a portion of the non-visible light NV1 incident on the eye 1 is reflected by the eye 1 toward the diffraction portion 200b. The non-visible light NV1 incident on the diffraction portion 200b is reflected and diffracted toward the light reception element 300a to enter the light reception element 300a.

When the non-visible light source 100b is turned on, the non-visible light NV2 is emitted from the non-visible light source 100b toward the eye 1. At least a portion of the non-visible light NV2 incident on the eye 1 is reflected by the eye 1 toward the diffraction portion 200c. The non-visible light NV2 incident on the diffraction portion 200c is reflected and diffracted toward the light reception element 300b to enter the light reception element 300b.

(Effects of Eye Information Detection Device of Example 1 of First Embodiment)

The eye information detection device 10-1 of Example 1 described above includes two or more (e.g., two) non-visible light sources 100a and 100b having different light emission wavelengths, the diffractive optical element 200 disposed on the optical path of the non-visible light emitted from each of the two or more non-visible light sources 100a and 100b and reflected by the eye 1, and the light reception system 300 that receives the non-visible light NV1 and the non-visible light NV2 reflected by the eye 1 and passing through the diffractive optical element 200.

As a result, it is possible to detect the eye information (the orientation of the eye 1, a size of a pupil 1a, and the like) with high accuracy on the basis of the amounts of the two or more rays of non-visible light NV1 and NV2 received by the light reception system 300.

In addition, the use of infrared light (e.g., near-infrared light) as the non-visible light NV1 and the non-visible light NV2 makes it possible to detect the eye information without affecting the eye 1 or causing the user to unnecessarily recognize light.

The light reception system 300 is disposed on the eye 1 side of the plane including the in-plane direction of the diffractive optical element 200. This makes it possible to reduce the thickness of the eye information detection device 10-1.

The diffractive optical element 200 diffracts (e.g., reflects and diffracts) the non-visible light NV1 and the non-visible light NV2 reflected by the eye 1 toward the light reception system 300. This makes it possible to cause the non-visible light to enter the light reception system 300 disposed on the eye 1 side with a simple configuration.

The diffractive optical element 200 includes two or more diffraction portions 200b and 200c that each individually correspond to a wavelength of one of the two or more rays of non-visible light NV1 and NV2, and each diffract the non-visible light having the corresponding wavelength in a direction based on the wavelength. This makes it possible to diffract the two or more rays of non-visible light in desired respective directions different from each other.

The two or more diffraction portions 200b and 200c are disposed at different positions in the in-plane direction of the diffractive optical element 200. This makes it easier to separate the non-visible light from the respective diffraction portions, making it possible to suppress crosstalk at the light reception system 300.

The light reception system 300 includes the two or more light reception elements 300a and 300b, and the two or more rays of non-visible light NV1 and NV2 reflected by the eye 1 and diffracted by the two or more diffraction portions 200b and 200c individually enter the two or more light reception elements 300a and 300b, respectively. This makes it possible to suppress crosstalk between the light reception elements.

Note that if the two non-visible light sources 100a and 100b are turned on sequentially (at different timings), it is possible to suppress crosstalk more reliably.

(Eye Information Detection Device of Example 2 of First Embodiment)

A description is given below of an eye information detection device 10-2 of Example 2 of the first embodiment, with reference to FIG. 3.

As illustrated in FIG. 3, the eye information detection device 10-2 has a configuration similar to that of the eye information detection device 10-1 of Example 1 described above, except that the two non-visible light sources 100a and 100b are provided on the light reception system 300 side instead of the diffractive optical element 200 side.

Specifically, the non-visible light source 100a is disposed in the vicinity of the light reception element 300a in such a manner that the emission direction thereof is oriented toward the diffraction portion 200b. The non-visible light source 100b is disposed in the vicinity of the light reception element 300b in such a manner that the emission direction thereof is oriented toward the diffraction portion 200c.

The non-visible light source 100a may be provided integrally with the light reception element 300a or the light reception element 300b.

The non-visible light source 100b may be provided integrally with the light reception element 300b or the light reception element 300a.

In the eye information detection device 10-2, the non-visible light NV1 emitted from the non-visible light source 100a is reflected and diffracted by the diffraction portion 200b, and enters the eye 1. At least a portion of the non-visible light NV1 reflected by the eye 1 is reflected and diffracted by the diffraction portion 200b to enter the light reception element 300a. That is, at least a portion of the non-visible light NV1 applied from the non-visible light source 100a to the diffraction portion 200b travels along approximately the same path to enter the light reception element 300a.

In the eye information detection device 10-2, the non-visible light NV2 emitted from the non-visible light source 100b is reflected and diffracted by the diffraction portion 200c, and enters the eye 1. At least a portion of the non-visible light NV2 reflected by the eye 1 is reflected and diffracted by the diffraction portion 200c to enter the light reception element 300b. That is, at least a portion of the non-visible light NV2 applied from the non-visible light source 100b to the diffraction portion 200c is reflected and diffracted by the diffraction portion 200c to enter the light reception element 300b. That is, at least a portion of the non-visible light NV2 applied from the non-visible light source 100b to the diffraction portion 200c travels along approximately the same path to enter the light reception element 300b.

With the eye information detection device 10-2, for example, in a case where the HMD has an eyeglass-shape, it is possible to improve the degree of freedom in designing the frame, because the non-visible light source is not provided at the diffractive optical element 200.

(Eye Information Detection Device of Example 3 of First Embodiment)

A description is given below of an eye information detection device 10-3 of Example 3 of the first embodiment, with reference to FIG. 4.

As illustrated in FIG. 4, the eye information detection device 10-3 of Example 3 has a configuration similar to that of the eye information detection device 10-1 of Example 1 described above, except that a toroidal lens is disposed before each light reception element.

Specifically, in the eye information detection device 10-3, the light reception system 300 includes two or more (e.g., two) light reception elements 300*a* and 300*b*, and a toroidal lens disposed on an optical path of the non-visible light between the diffractive optical element 200 and each of the two or more light reception elements 300*a* and 300*b*.

In more detail, a toroidal lens 300*c* is disposed on the optical path of the non-visible light NV1 between the diffraction portion 200*b* and the light reception element 300*a*, and a toroidal lens 300*d* is disposed on the optical path of the non-visible light NV2 between the diffraction portion 200*c* and the light reception element 300*b*.

In this case, the non-visible light NV1 passing through the toroidal lens 300*c* enters the light reception element 300*a*. The non-visible light NV2 passing through the toroidal lens 300*d* enters the light reception element 300*b*.

Accordingly, it is possible to suppress astigmatism of the non-visible light caused by each diffraction portion. It is therefore possible to improve the accuracy of the detection of the non-visible light at the light reception element corresponding to the diffraction portion.

Note that each toroidal lens is an optical element that corrects the astigmatism occurring at the corresponding diffraction portion and has astigmatism opposite to such astigmatism. Therefore, the shape of each toroidal lens may be changed depending on the diffraction portion.

Further, each toroidal lens may include two or more (e.g., two) cylindrical lenses.

Note that in the configuration of the eye information detection device 10-2 of Example 2 described above and illustrated in FIG. 3, the toroidal lens 300*c* may be disposed before the light reception element 300*a* and the toroidal lens 300*d* may be disposed before the light reception element 300*b*. In this case also, it is possible to achieve effects similar to those of the eye information detection device 10-3.

(Eye Information Detection Device of Example 4 of First Embodiment)

A description is given below of an eye information detection device 10-4 of Example 4 of the first embodiment, with reference to FIG. 5.

As illustrated in FIG. 5, the eye information detection device 10-4 of Example 4 has a configuration similar to that of the eye information detection device 10-1 of Example 1 described above, except that a bandpass filter is disposed before each light reception element.

Specifically, in the eye information detection device 10-4, the light reception system 300 includes two or more light reception elements 300*a* and 300*b* corresponding to the two or more non-visible light sources 100*a* and 100*b*, and a bandpass filter that is disposed on the optical path of the non-visible light between the diffractive optical element 200 and each of the two or more light reception elements 300*a* and 300*b* and allows the non-visible light to pass therethrough.

In more detail, a bandpass filter 300*e* that has a passband of the wavelength range of the non-visible light NV1 is disposed on the optical path of the non-visible light NV1 between the diffraction portion 200*b* and the light reception element 300*a*. A bandpass filter 300*f* that has a passband of the wavelength range of the non-visible light NV1 is disposed on the optical path of the non-visible light NV2 between the diffraction portion 200*c* and the light reception element 300*b*.

In this case, only the non-visible light NV1 of the light reflected and diffracted by the diffractive optical element 200 and incident on the bandpass filter 300*e* passes through the bandpass filter 300*e* to enter the light reception element 300*a*. Therefore, even if the non-visible light NV2 reflected and diffracted by the diffraction portion 200*c* enters the bandpass filter 300*e* as stray light, the light is cut (blocked) by the bandpass filter 300*e*. In other words, the stray light does not enter the light reception element 300*a*. Therefore, crosstalk is suppressed.

In addition, only the non-visible light NV2 of the light reflected and diffracted by the diffractive optical element 200 and incident on the bandpass filter 300*f* passes through the bandpass filter 300*f* to enter the light reception element 300*b*. Therefore, even if a portion of the non-visible light NV1 reflected and diffracted by the diffraction portion 200*b* enters the bandpass filter 300*f* as stray light, the light is cut (blocked) by the bandpass filter 300*f*. In other words, the stray light does not enter the light reception element 300*b*. Therefore, crosstalk is suppressed.

In the eye information detection device 10-4 described above, the light reception system 300 includes the two or more (e.g., two) light reception elements 300*a* and 300*b* corresponding to the two or more (e.g., two) non-visible light sources 100*a* and 100*b*, and the bandpass filter that is disposed on the optical path of the non-visible light between the diffractive optical element 200 and each of the two or more light reception elements 300*a* and 300*b* and allows the non-visible light to pass therethrough.

This makes it possible to suppress crosstalk even when the two or more non-visible light sources 100*a* and 100*b* are turned on at the same timing.

Accordingly, it is possible to improve accuracy of detection at each light reception element while reducing the time necessary for detecting the eye information.

3. <Eye Information Detection Device According to Second Embodiment of Present Technology>

A description is given below of an eye information detection device 20 according to a second embodiment (eye information detection devices 20-1 to 20-3 of Examples 1 to 3), with reference to the drawings.

(Eye Information Detection Device of Example 1 of Second Embodiment)

FIG. 6 is a schematic cross-sectional view of a configuration of the eye information detection device 20-1 of Example 1 of the second embodiment.

As illustrated in FIG. 6, the eye information detection device 20-1 of Example 1 has a configuration similar to that of the eye information detection device 10-1 of Example 1 of the first embodiment described above, except that a diffractive optical element 200-1 includes a single diffraction portion 200*b* and that a light reception system 300-1 includes a single light reception element 300*a*.

In the eye information detection device 20-1, the two or more non-visible light sources 100a and 100b are turned on at different timings.

At least a portion of the non-visible light NV1, applied to the eye 1 from the turned-on non-visible light source 100a, is reflected in a first direction toward the diffraction portion 200b. The non-visible light NV1 incident on the diffraction portion 200b is reflected and diffracted by the diffraction portion 200b toward the light reception element 300a.

At least a portion of the non-visible light NV2, applied to the eye 1 from the non-visible light source 100b turned on at a timing different from that of the non-visible light source 100a, is reflected in a second direction that is toward the diffraction portion 200b and different from the above-described first direction. The non-visible light NV2 incident on the diffraction portion 200b is reflected and diffracted by the diffraction portion 200b toward the light reception element 300a.

Thus, the non-visible light NV1 and the non-visible light NV2 reflected by the eye 1 in different directions are eccentrically reflected in the same direction on the basis of a dispersion property of the wavelength of the diffractive optical element 200-1. Therefore, it is possible to receive the non-visible light NV1 and the non-visible light NV2 by the single light reception element 300a.

In the eye information detection device 20-1, the non-visible light NV1 and the non-visible light NV2 emitted from the two or more non-visible light sources 100a and 100b at different timings are reflected by the eye 1 in different directions and reflected and diffracted by the diffractive optical element 200-1 in the same direction. These two or more rays of non-visible light NV1 and NV2 reflected and diffracted in the same direction are caused to enter the light reception element 300a at different timings.

With the eye information detection device 20-1 described above, the non-visible light NV1 and the non-visible light NV2 reflected by the eye 1 in different directions are caused to enter the light reception element 300a at different timings. Therefore, it is possible to detect depth information of the eye 1 with high accuracy, for example.

In addition, the two or more rays of non-visible light NV1 and NV2 are received by the same light reception element 300a. Therefore, as compared with a case where they are received by different light reception elements, an influence of an individual difference between light reception elements (e.g., variations in light reception sensitivity) is reduced. That is, even if the information amount increases, the detection error decreases.

In addition, because the two or more rays of non-visible light NV1 and NV2 are received by the single light reception element 300a, as compared with a case where they are received by two or more light reception elements, it is possible to achieve reduction in power consumption and size.

Further, because the two or more rays of non-visible light NV1 and NV2 are received by the light reception element 300a at different timings, it is possible to suppress crosstalk.
(Eye Information Detection Device of Example 2 of Second Embodiment)

FIG. 7 is a schematic cross-sectional view of an eye information detection device 20-2 of Example 2 of the second embodiment.

As illustrated in FIG. 7, the eye information detection device 20-2 of Example 2 has a configuration similar to that of the eye information detection device 20-1 of Example 1 described above and illustrated in FIG. 6, except that the non-visible light sources 100a and 100b are disposed on the light reception element 300a side instead of the diffractive optical element 200-1 side.

Specifically, the non-visible light source 100a is disposed in the vicinity of the light reception element 300a (at a position off of the light reception surface of the light reception element 300a) in such a manner that the light emission direction thereof is oriented toward the diffraction portion 200b. The non-visible light source 100b is disposed in the vicinity of the light reception element 300a (at a position off of the light reception surface of the light reception element 300a) in such a manner that the light emission direction thereof is oriented toward the diffraction portion 200b. At least one of the two non-visible light sources 100a and 100b may be provided integrally with the light reception element 300a.

In the eye information detection device 20-2 also, the two or more non-visible light sources 100a and 100b are turned on at different timings.

The non-visible light NV1 emitted from the turned-on non-visible light source 100a is reflected and diffracted by the diffraction portion 200b toward the eye 1. At least a portion of the non-visible light NV1 incident on the eye 1 is reflected and diffracted by the diffraction portion 200b toward the light reception element 300a. The non-visible light NV2 emitted from the non-visible light source 100b turned on at a timing different from that of the non-visible light source 100a is reflected and diffracted by the diffraction portion 200b toward the eye 1. At least a portion of the non-visible light NV2 incident on the eye 1 is reflected and diffracted by the diffraction portion 200b toward the light reception element 300a.

With the eye information detection device 20-2 described above, effects similar to those of the eye information detection device 20-1 of Example 1 described above are achievable. In addition, for example, in a case where it is mounted on an eyeglass-type HMD, it is possible to improve the degree of freedom in designing the frame because the two or more non-visible light sources 100a and 100b are not provided at the diffractive optical element 200-1.
(Eye Information Detection Device of Example 3 of Second Embodiment)

FIG. 8 is a schematic cross-sectional view of an eye information detection device 20-3 of Example 3 of the second embodiment.

As illustrated in FIG. 8, the eye information detection device 20-3 of Example 3 has a configuration similar to that of the eye information detection device 20-1 of Example 1 described above and illustrated in FIG. 6, except that the toroidal lens 300c is disposed before the light reception element 300a.

In the eye information detection device 20-3 also, the two or more non-visible light sources 100a and 100b are turned on at different timings.

At least a portion of the non-visible light NV1 applied to the eye 1 from the turned-on non-visible light source 100a is reflected by the eye 1 toward the diffraction portion 200b. The non-visible light NV1 incident on the diffraction portion 200b is reflected by the diffraction portion 200b toward the toroidal lens 300c. The non-visible light NV1 incident on the toroidal lens 300c is caused to enter the light reception element 300a in a state where astigmatism is removed.

At least a portion of the non-visible light NV2 applied to the eye 1 from the non-visible light source 100b turned on at a timing different from that of the non-visible light source 100b is reflected by the eye 1 toward the diffraction portion 200b. The non-visible light NV2 incident on the diffraction portion 200b is reflected by the diffraction portion 200b toward the toroidal lens 300c. The non-visible light NV2 incident on the toroidal lens 300c is caused to enter the light reception element 300a in a state where astigmatism is removed.

With the eye information detection device 20-3 described above, because the optical paths of the two or more rays of non-visible light NV1 and NV2 from the diffraction portion 200b to the light reception element 300a approximately match each other, it is possible to improve accuracy of detection at each 300a with astigmatism of each of the two or more rays of non-visible light NV1 and NV2 being removed, by only disposing the single toroidal lens 300c before the single light reception element 300a.

Note that in the configuration of the eye information detection device 20-2 of Example 2 described above and illustrated in FIG. 7, the toroidal lens 300c may be disposed before the light reception element 300a. In this case also, effects similar to those of the eye information detection device 20-3 are achievable.

4. <Eye Information Detection Device According to Third Embodiment of Present Technology>

A description is given below of an eye information detection device 30 according to a third embodiment (eye information detection devices 30-1 to 30-4 of Examples 1 to 4), with reference to the drawings.

(Eye Information Detection Device of Example 1 of Third Embodiment)

FIG. 9 is a schematic cross-sectional view of an eye information detection device 30-1 of Example 1 of the third embodiment.

As illustrated in FIG. 9, the eye information detection device 30-1 of Example 1 has a configuration similar to that of the eye information detection device 20-1 of Example 1 of the second embodiment described above and illustrated in FIG. 6, except that the light reception system 300-1 includes two or more (e.g., two) light reception elements 300a and 300b.

In the eye information detection device 30-1, the two or more rays of non-visible light NV1 and NV2 reflected by the eye 1 in the same direction (approximately the same optical path, for example, toward the front of the eye 1) are eccentrically reflected in different directions due to the dispersion property of the wavelength of the diffractive optical element 200-1. It is therefore possible to cause the two or more rays of non-visible light NV1 and NV2 reflected by the eye 1 in the same direction to enter the two or more light reception elements 300a and 300b, respectively.

In the eye information detection device 30-1 described above, the light reception system 300 includes the two or more light reception elements 300a and 300b, and the two or more rays of non-visible light NV1 and NV2 reflected by the eye 1 in the same direction and diffracted by the diffractive optical element 200-1 in different directions individually enter the two or more light reception elements 300a and 300b, respectively.

Accordingly, effects similar to those of the eye information detection device 20-1 of Example 1 of the second embodiment described above and illustrated in FIG. 6 are achievable. In addition, it is possible to improve robustness by causing the light reception elements to be different from each other in resolution (the number of pixels or the number of light reception regions), an angle of view, or the like.

Note that in the eye information detection device 30-1 of Example 1 described above, the two or more light reception elements 300a and 300b may be different from each other in resolution (the number of pixels or the number of light reception regions). For example, one of the two light reception elements 300a and 300b may have a high resolution to be used in abnormality detection, initial position adjustment at the time of assembling, or the like, and the other may have a low resolution to be used in constant monitoring.

This makes it possible to achieve lower power consumption and to use the two or more light reception elements 300a and 300b for different uses.

(Eye Information Detection Device 30-2 of Example 2 of Third Embodiment)

FIG. 10 is a schematic cross-sectional view of the eye information detection device 30-2 of Example 2 of the third embodiment.

As illustrated in FIG. 10, in the eye information detection device 30-2 of Example 2 has a configuration similar to that of the eye information detection device 30-1 of Example 1 described above, except that the non-visible light sources 100a and 100b are provided on the light reception system 300 side instead of the diffractive optical element 200-1 side.

Specifically, the non-visible light source 100a is disposed in the vicinity of the light reception element 300a (at a position off of the light reception surface of the light reception element 300a) in such a manner that the light emission direction thereof is oriented toward the diffraction portion 200b. The non-visible light source 100b is disposed in the vicinity of the light reception element 300b (at a position off of the light reception surface of the light reception element 300b) in such a manner that the light emission direction thereof is oriented toward the diffraction portion 200b. The non-visible light source 100a may be provided integrally with the light reception element 300a or the light reception element 300b.

The non-visible light source 100b may be provided integrally with the light reception element 300b or the light reception element 300a.

In the eye information detection device 30-2, the two or more non-visible light sources 100a and 100b are turned on at the same timing or at different timings. The non-visible light NV1 emitted from the turned-on non-visible light source 100a is reflected and diffracted by the diffraction portion 200b toward the eye 1. At least a portion of the non-visible light NV1 reflected by the eye 1 is reflected and diffracted by the diffraction portion 200b toward the light reception element 300a. The non-visible light NV2 emitted from the non-visible light source 100b turned on at the same timing as or a timing different from that of the non-visible light source 100a is reflected and diffracted by the diffraction portion 200b toward the eye 1. At least a portion of the non-visible light NV2 reflected by the eye 1 is reflected and diffracted by the diffraction portion 200b toward the light reception element 300b.

With the eye information detection device 30-2 described above, effects similar to those of the eye information detection device 30-1 of Example 1 described above and illustrated in FIG. 9 are achievable. In addition, for example, in a case where it is mounted on an eyeglass-type HMD, it is possible to improve the degree of freedom in designing the frame, because the two or more non-visible light sources 100a and 100b are not provided at the diffractive optical element 200-1.

(Eye Information Detection Device of Example 3 of Third Embodiment)

FIG. 11 is a schematic cross-sectional view of the eye information detection device 30-3 of Example 3 of the third embodiment.

As illustrated in FIG. 11, the eye information detection device 30-3 of Example 3 has a configuration similar to that of the eye information detection device 30-1 of Example 1 described above, except that a toroidal lens is disposed before each light reception element.

Specifically, in the eye information detection device 30-3, the light reception system 300 includes the two or more (e.g., two) light reception elements 300a and 300b and a toroidal lens disposed on the optical path of the non-visible light between the diffractive optical element 200 and each of the two or more light reception elements 300a and 300b.

In more detail, the toroidal lens 300c is disposed on the optical path of the non-visible light NV1 between the diffraction portion 200b and the light reception element 300a, and the toroidal lens 300d is disposed on the optical path of the non-visible light NV2 between the diffraction portion 200c and the light reception element 300b.

In this case, the non-visible light NV1 passing through the toroidal lens 300c is caused to enter the light reception element 300a. The non-visible light NV2 passing through the toroidal lens 300d is caused to enter the light reception element 300b.

This makes it possible to suppress astigmatism of the non-visible light caused by each diffraction portion. Accordingly, it is possible to improve the accuracy of the detection of the non-visible light at the light reception element corresponding to the diffraction portion.

Note that in the configuration of the eye information detection device 30-2 of Example 2 described above and illustrated in FIG. 10, the toroidal lens 300c may be disposed before the light reception element 300a, and the toroidal lens 300d may be disposed before the light reception element 300b. In this case also, effects similar to those of the eye information detection device 30-3 are achievable.

(Eye Information Detection Device of Example 4 of Third Embodiment)

A description is given below of the eye information detection device 30-4 of Example 4 of the third embodiment, with reference to FIG. 12.

As illustrated in FIG. 12, the eye information detection device 30-4 of Example 4 has a configuration similar to that of the eye information detection device 30-1 of Example 1 described above, except that a bandpass filter is disposed before each light reception element.

Specifically, in the eye information detection device 30-4, the light reception system 300 includes two or more light reception elements 300a and 300b corresponding to the two or more non-visible light sources 100a and 100b, and the bandpass filter that is disposed on the optical path of the non-visible light between the diffractive optical element 200-1 and each of the two or more light reception elements 300a and 300b and allows the non-visible light to pass therethrough.

In more detail, the bandpass filter 300e that has the passband of the wavelength range of the non-visible light NV1 is disposed on the optical path of the non-visible light NV1 between the diffraction portion 200b and the light reception element 300a. The bandpass filter 300f that has the passband of the wavelength range of the non-visible light NV1 is disposed on the optical path of the non-visible light NV2 between the diffraction portion 200b and the light reception element 300b.

In this case, only the non-visible light NV1 of the light reflected and diffracted by the diffractive optical element 200-1 and incident on the bandpass filter 300e passes through the bandpass filter 300e to enter the light reception element 300a. Therefore, even if the non-visible light NV2 reflected and diffracted by the diffraction portion 200b enters the bandpass filter 300e as stray light, the light is cut (blocked) by the bandpass filter 300e. In other words, the stray light does not enter the light reception element 300a. Therefore, crosstalk is suppressed.

In addition, only the non-visible light NV2 of the light reflected and diffracted by the diffraction portion 200c and incident on the bandpass filter 300f passes through the bandpass filter 300f to enter the light reception element 300b. Therefore, even if a portion of the non-visible light NV1 reflected and diffracted by the diffraction portion 200b enters the bandpass filter 300f as stray light, the light is cut (blocked) by the bandpass filter 300f. In other words, the stray light does not enter the light reception element 300b. Therefore, crosstalk is suppressed.

In the eye information detection device 30-4 described above, the light reception system 300 includes the two or more (e.g., two) light reception elements 300a and 300b corresponding to the two or more (e.g., two) non-visible light sources 100a and 100b, and the bandpass filter that is disposed on the optical path of the non-visible light between the diffractive optical element 200 and each of the two or more light reception elements 300a and 300b and allows the non-visible light to pass therethrough.

This makes it possible to suppress crosstalk even when the two or more non-visible light sources 100a and 100b are turned on at the same timing.

Accordingly, it is possible to improve the accuracy of the detection performed by each light reception element while reducing the time necessary for detecting the eye information.

5. <Eye Information Detection Device According to Fourth Embodiment of Present Technology>

A description is given below of an eye information detection device 40 according to a fourth embodiment, with reference to FIG. 13.

As illustrated in FIG. 13, the eye information detection device 40 according the fourth embodiment is characterized in that, in the eye information detection device 20-1 of Example 1 of the second embodiment described above and illustrated in FIG. 6, the diffractive optical element has a stack structure in which two or more diffraction portions are stacked, or the diffractive optical element includes a multi-recorded HOE (holographic optical element) as the diffraction portions, thereby making appropriate (preferably optimizing) the diffraction efficiency of each non-visible light.

Specifically, in one example, in the eye information detection device 40, a diffractive optical element 200-2 has a stack structure in which the two diffraction portions 200b and 200c are stacked. The diffraction portion 200b has diffraction efficiency of the non-visible light NV1 that is made appropriate (is designed to be high), and the diffraction portion 200c has diffraction efficiency of the non-visible light NV2 that is made appropriate (is designed to be high).

In the eye information detection device 40, the two or more diffraction portions 200b and 200c are disposed at the same position (e.g., at a position directly opposite to the eye 1) in the in-plane direction of the diffractive optical element 200-2.

In the eye information detection device 40, the two or more non-visible light sources 100a and 100b are turned on at different timings. The two or more rays of non-visible light NV1 and NV2 emitted from the two or more respective non-visible light sources 100a and 100b at different timings are caused to enter the eye 1 at different timings. The two or more rays of non-visible light NV1 and NV2 reflected by the eye 1 in different directions and reflected and diffracted by the corresponding two or more diffraction portions 200b and 200c in the same direction are caused to enter the light reception element 300a at different timings.

With the eye information detection device 40, the reflected light amount of each non-visible light is increased. This makes it possible to reduce electric power to supply to each non-visible light source, allowing for lower power consumption.

In addition, the diffraction efficiency of each diffraction portion is made appropriate. This even allows for a design that has a greater difference in angle of the reflection direction, from the eye 1, between the two or more rays of non-visible light NV1 and NV2 and that is able to suppress crosstalk.

6. <Eye Information Detection Device According to Fifth Embodiment of Present Technology>

A description is given below of an eye information detection device 50 according to a fifth embodiment, with reference to FIG. 14.

As illustrated in FIG. 14, the eye information detection device 50 according the fifth embodiment is characterized in that, in the eye information detection device 30-1 of Example 1 of the third embodiment described above and illustrated in FIG. 9, the diffractive optical element has a stack structure in which two or more diffraction portions are stacked, or the diffractive optical element includes a multi-recorded HOE (holographic optical element) as the diffraction portions, thereby making appropriate (preferably optimizing) the diffraction efficiency of each non-visible light.

Specifically, in one example, in the eye information detection device 50, a diffractive optical element 200-2 has a stack structure in which the two diffraction portions 200b and 200c are stacked. The diffraction portion 200b has diffraction efficiency of the non-visible light NV1 that is made appropriate, and the diffraction portion 200c has diffraction efficiency of the non-visible light NV2 that is made appropriate.

In the eye information detection device 50, the two or more diffraction portions 200b and 200c are disposed at the same position (e.g., at the position directly opposite to the eye 1) in the in-plane direction of the diffractive optical element 200-2.

In the eye information detection device 50, the two or more non-visible light sources 100a and 100b are turned on at the same timing or at different timings. The two or more rays of non-visible light NV1 and NV2 emitted from the two or more respective non-visible light sources 100a and 100b are caused to enter the eye 1 at the same timing or at different timings. The two or more rays of non-visible light NV1 and NV2 reflected by the eye 1 in the same direction and diffracted by the two or more diffraction portions 200b and 200c in different directions are caused to enter the light reception elements 300a and 300b, respectively, at the same timing or at different timings.

With the eye information detection device 50, the reflected light amount of each non-visible light is increased. This makes it possible to reduce electric power to supply to each non-visible light source, allowing for lower power consumption.

In addition, the diffraction efficiency of each diffraction portion is made appropriate. This even allows for a design that has a greater difference in angle of the reflection direction, from the diffractive optical element 200-2 toward the light reception system 300, between the two or more rays of non-visible light NV1 and NV2 and that is able to suppress crosstalk.

7. <Eye Information Detection Device According to Sixth Embodiment of Present Technology>

A description is given below of an eye information detection device 60 according to a sixth embodiment, with reference to FIGS. 15, 16A, 16B, and 16C.

As illustrated in FIG. 15, the eye information detection device 60 according the sixth embodiment is characterized in that the diffractive optical element has a stack structure in which two or more diffraction portions are stacked, or the diffractive optical element includes a multi-recorded HOE (holographic optical element) as the diffraction portions, thereby making appropriate (preferably optimizing) the diffraction efficiency of each non-visible light.

In addition, in the eye information detection device 60, the light reception system 300-1 includes a single light reception element 300a.

Specifically, in one example, in the eye information detection device 50, the diffractive optical element 200-2 has a stack structure in which the two diffraction portions 200b and 200c are stacked. The diffraction portion 200b has diffraction efficiency of the non-visible light NV1 that is made appropriate, and the diffraction portion 200c has diffraction efficiency of the non-visible light NV2 that is made appropriate.

In the eye information detection device 60, the two or more diffraction portions 200b and 200c are disposed at the same position (e.g., at the position directly opposite to the eye 1) in the in-plane direction of the diffractive optical element 200-1.

In the eye information detection device 60, the two or more non-visible light sources 100a and 100b are turned on at different timings. The two or more rays of non-visible light NV1 and NV2 emitted from the two or more respective non-visible light sources 100a and 100b at different timings are caused to enter the eye 1 at different timings. The two or more rays of non-visible light NV1 and NV2 reflected by the eye 1 in the same direction and diffracted by the two or more diffraction portions 200b and 200c in the same direction are caused to enter the light reception element 300a at different timings.

The two or more rays of non-visible light NV1 and NV2 reflected by the eye 1 in the same direction at different timings and diffracted by the two or more diffraction portions 200b and 200c in the same direction are caused to enter the light reception element 300a at different timings.

The non-visible light NV1 emitted from the non-visible light source 100a has a center wavelength in a wavelength band from 700 nm to 900 nm. The non-visible light NV2 emitted from the non-visible light source 100b has a center wavelength in a wavelength band from 900 nm to 1000 nm. The diffractive optical element 200-2 reflects and diffracts, toward the light reception element 300a, the non-visible light NV1 and the non-visible light NV2 reflected by the eye 1 in the same direction.

Here, as illustrated in FIG. 16A, in the eye information detection device 60, a portion of the non-visible light NV1 incident on the eye 1 is reflected by the pupil 1a (having high reflectance) and the other portion thereof is reflected by a surrounding portion (having medium reflectance) of the pupil 1a. Therefore, the amount of the reflected light at the middle portion (the pupil 1a) becomes large and the amount of the reflected light at the surrounding portion of the pupil 1a becomes medium.

In contrast, as illustrated in FIG. 16B, in the eye information detection device 60, a portion of the non-visible light NV2 incident on the eye 1 passes through the pupil 1a and is reflected by a retina (having low reflectance) and the other portion thereof is reflected by the surrounding portion (having medium reflectance) of the pupil 1a. Therefore, the amount of the reflected light at the middle portion (the retina) becomes small and the amount of the reflected light at the surrounding portion of the pupil 1a becomes medium.

Accordingly, for example, it is possible to extract information related to the pupil 1a (e.g., the size of the pupil 1a) as illustrated in FIG. 16C, by obtaining a difference between a first output (the amount of received light) of the light reception element 300a receiving the non-visible light NV1 reflected by the eye 1 and a second output (the amount of received light) of the light reception element 300a receiving the non-visible light NV2 reflected by the eye 1.

In addition, for example, it is also possible to detect the size of the pupil 1a with high accuracy on the basis of the first and the second outputs described above.

8. <Eye Information Detection Device According to Seventh Embodiment of Present Technology>

A description is given below of an eye information detection device according to a seventh embodiment, with reference to FIGS. 17A and 17B.

As illustrated in FIG. 17A, in the eye information detection device according to the seventh embodiment, the light reception system 300 includes at least one light reception element 300a including two or more (e.g., four) first to fourth light reception regions 300a1 to 300a4 disposed two-dimensionally. In FIG. 17A, for easier understanding, an image of the eye 1 is superimposed on a light reception surface of the light reception element 300a.

The first to fourth light reception regions 300a1 to 300a4 are disposed, for example, in a two-dimensional grid pattern.

An output of each light reception region varies, for example, depending on the orientation of the eye 1 (the line of sight) as illustrated in FIG. 17B.

For example, in FIG. 17A, in a case where the outputs (the amounts of the received light) of the first light reception region 300a1, the third light reception region 300a3, and the fourth light reception region 300a4 are high and the output (the amount of the received light) of the second light reception region 300a2 is low, it can be estimated that the second light reception region 300a2 receives most of the reflected light from the black portion of the eye 1 having relatively low reflectance. Therefore, it can be found out that the eye 1 is oriented in a direction D1 in FIG. 17B.

For example, in FIG. 17B, in a case where the outputs (the amounts of the received light) of the second light reception region 300a2, the third light reception region 300a3, and the fourth light reception region 300a4 are high and the output (the amount of the received light) of the first light reception region 300a1 is low, it can be estimated that the first light reception region 300a1 receives most of the reflected light from the black portion of the eye 1 having relatively low reflectance. Therefore, it can be found out that the eye 1 is oriented in a direction D2 in FIG. 17B.

In such a manner, it is possible to detect the orientation of the eye 1 on the basis of the outputs of the four light reception regions 300a1 to 300a4. This detection is performable by a signal detection circuit coupled to the light reception element 300a. The signal detection circuit may be provided, for example, with use of a CPU, a FPGA, etc.

With the eye information detection device of the seventh embodiment, it is possible to detect the orientation of the eye 1 while achieving lower latency and lower power consumption as compared with, for example, a case of using an image sensor in which a large number of pixels are disposed at high density as a light reception element.

9. <Eye Information Detection Device According to Eighth Embodiment of Present Technology>

A description is given below of an eye information detection device of an eighth embodiment, with reference to FIGS. 18A, 18B, and 18C.

In the eye information detection device of the eighth embodiment, the two or more non-visible light sources 100a and 100b are caused to emit light by frequency modulation and perform lock-in detection.

More specifically, the eye information detection device of the eighth embodiment includes a signal detection circuit (see FIGS. 17A and 17B) that detects a signal outputted from each of the two or more (e.g., four) light reception regions of the light reception element.

As illustrated in FIGS. 18A and 18B, in the eye information detection device of the eighth embodiment, the two or more rays of non-visible light NV1 and NV2 have different frequencies $\omega 1$ and $\omega 2$, and the signal detection circuit detects the signal outputted from the light reception element when each of the two or more rays of non-visible light NV1 and NV2 is received by the light reception element, on the basis of the frequency of the non-visible light. Accordingly, it is possible to detect each non-visible light with high accuracy.

The signal detection circuit is configured, for example, as a demodulation circuit as illustrated in FIG. 18C. The demodulation circuit has first and second coherent detection circuits.

The first coherent detection circuit performs coherent detection of a signal outputted from the light reception element when the non-visible light NV1 having the frequency $\omega 1$ is received by the light reception element, and outputs a demodulated signal (a demodulation signal).

The second coherent detection circuit performs coherent detection of a signal outputted from the light reception element when the non-visible light NV2 having the frequency $\omega 2$ is received by the light reception element, and outputs a demodulated signal (a demodulation signal).

Note that in spatial division of light, the light amount reduces in inverse proportion to the number of divisions; however, in wavelength division of light, the amount of light reduced by frequency modulation is constant regardless of the number of divisions (approximately half). Therefore, even if the number of the non-visible light sources is increased and the number of the wavelength divisions and the number of modulation frequencies are increased, it is possible to secure a certain light amount.

10. <Eye Information Detection Device According to Ninth Embodiment of Present Technology>

A description is given below of an eye information detection device according to a ninth embodiment, with reference to FIGS. 24A and 24B.

The eye information detection device of the ninth embodiment includes a signal detection circuit (see FIGS. 17A and 17B) that detects a signal outputted from each of the two or more (e.g., four) light reception regions of the light reception element.

As illustrated in FIGS. 24A and 24B, in the eye information detection device of the ninth embodiment, the two or more rays of non-visible light NV1 and NV2 emit light in opposite phases, and the signal detection circuit detects the signal outputted from the light reception element when each of the two or more rays of non-visible light is received by the light reception element, on the basis of the phase of the non-visible light.

The signal detection circuit is configured, for example, as a demodulation circuit as illustrated in FIG. 24B. The demodulation circuit has a coherent detection circuit.

The coherent detection circuit alternately performs coherent detection of a signal outputted from the light reception element when the non-visible light NV1 having the frequency ω and a phase θ1 is received by the light reception element, and coherent detection of a signal outputted from the light reception element when the non-visible light NV2 having the frequency ω and a phase θ2 which is an opposite phase of the phase θ1 is received by the light reception element, and outputs respective demodulated signals (demodulation signals).

That is, in the eye information detection device of the ninth embodiment, in one example, the two or more non-visible light sources 100a and 100b are caused to emit light at frequencies having mutually opposite phases, and thereby perform lock-in detection.

With the eye information detection device of the ninth embodiment, coherent detection of signals having mutually opposite phases is performed in a time-divisional manner. Therefore, it is possible to use the same demodulation circuit for the respective signals, thereby reducing the number of modulation circuits.

11. <Image Display Apparatus According to Tenth Embodiment of Present Technology>

A description is given below of an image display apparatus 1000 of a tenth embodiment (image display apparatuses 1000-1 and 1000-2 of Examples 1 and 2), with reference to the drawings.

(Image Display Apparatus of Example 1 of Tenth Embodiment)

A description is given below of the image display apparatus 1000-1 of Example 1 of the tenth embodiment, with reference to FIG. 19.

As illustrated in FIG. 19, the image display apparatus 1000-1 of Example 1 is an image display apparatus including the eye information detection device 40 of the fourth embodiment (see FIG. 13) described above.

Specifically, the image display apparatus 1000-1 further includes an image light projection unit 1000a and another diffractive optical element 2000. The image light projection unit 1000a projects image light IL (visible light). The diffractive optical element 2000 is provided at the diffractive optical element 200-2 of the eye information detection device 40 and diffracts (e.g., reflects and diffracts) the image light IL from the image light projection unit 1000a toward the eye 1.

The other diffractive optical element 2000 is stacked on the diffraction portion 200b of the diffractive optical element 200-2.

In one example, the image light projection unit 1000a is disposed on the eye 1 side of the plane including the in-plane direction of the diffractive optical element 200-2, and directly applies the image light IL to the other diffractive optical element 2000.

The image light projection unit 1000a includes a light source system, a control system (e.g., CPU, FPGA, etc.), and a projection optical system (e.g., a projection lens). The light source system includes a visible light source (e.g., a laser, an LED, or the like that emits visible light). The control system drives the light source on the basis of image information to generate the image light IL. The projection optical system projects image light.

The image light IL projected from the image light projection unit 1000a is reflected and diffracted by the other diffractive optical element 2000 toward the eye 1. When the reflected and diffracted image light IL enters the eye 1, it is possible for the user to visually recognize a real scene and the image IL (a virtual image) superimposed on the real scene by means of the other diffractive optical element 2000 and the diffractive optical element 200-2.

In the image display apparatus 1000-1, it is possible to control a characteristic of the image light IL (e.g., a luminance, a display position, or the like of the image light IL) on the basis of a detection result (the eye information) of the eye information detection device 40.

For example, the image display apparatus 1000-1 may decrease the luminance of the image light IL in a case where a detection result indicating that the pupil 1a is large is obtained from the eye information detection device 40.

For example, the image display apparatus 1000-1 may change the display position of the image light IL in accordance with the orientation of the eye 1 (the line of sight) obtained from the eye information detection device 40.

(Image Display Apparatus of Example 2 of Tenth Embodiment)

A description is given below of the image display apparatus 1000-2 of Example 2 of the tenth embodiment, with reference to FIG. 20.

As illustrated in FIG. 20, the image display apparatus 1000-2 of Example 2 is an image display apparatus including the eye information detection device 40 of the fourth embodiment (see FIG. 13) described above.

Specifically, the image display apparatus 1000-2 further includes the image light projection unit 1000a and the other diffractive optical element 2000. The image light projection unit 1000a projects the image light IL. The diffractive optical element 2000 is provided at the diffractive optical element 200-2 of the eye information detection device 40 and diffracts (e.g., reflects and diffracts) the image light IL from the image light projection unit 1000a toward the eye 1.

The other diffractive optical element 2000 is stacked on the diffraction portion 200b on the diffractive optical element 200-2.

Further, the image display apparatus 2000-2 further includes a beam splitter 3000 that is disposed between the other diffractive optical element 2000 and the light reception element 300a, reflects a portion of the image light projected from the image light projection unit 1000a toward the other diffractive optical element 2000, and transmits the other portion. The beam splitter 3000 is, for example, a half mirror.

Further, in one example, the image light projection unit 1000a is disposed on the opposite side to the eye 1 side of the beam splitter 3000.

This makes it possible to dispose the image light projection unit 1000a in a space which is a dead space, for example, in the image display apparatus 1000-1 of Example 1 illustrated in FIG. 19. Accordingly, it is possible to reduce the size of the image display apparatus 1000-2.

The image light projection unit 1000a projects the image light IL toward the beam splitter 3000. A portion of the image light IL incident on the beam splitter 3000 is reflected by the beam splitter 3000 toward the other diffractive optical element 2000, and the other portion passes through the beam splitter 3000. The image light IL incident on the other diffractive optical element 2000 is reflected and diffracted by the other diffractive optical element 2000 toward the eye 1. When the reflected and diffracted image light IL is caused to enter the eye 1, it is possible for the user to visually recognize a real scene and the image (a virtual image)

superimposed on the real scene by means of the other diffractive optical element 2000 and the diffractive optical element 200-2.

In the image display apparatus 1000-2 also, as with the image display apparatus 1000-1 of Example 1, it is possible to control the characteristic of the image light IL (e.g., the luminance, the display position, or the like of the image light IL) on the basis of the detection result (the eye information) of the eye information detection device 40.

Note that in the image display apparatus 1000-2 of Example 2 described above, the positional relationship of the image light projection unit 1000a and the light reception element 300a with respect to the beam splitter 3000 may be reversed. That is, the light passing through the beam splitter 3000 of the image light projected from the image light projection unit 1000a may be applied to the eye 1 via the other diffractive optical element 2000, and the light reflected by the beam splitter 3000 of the non-visible light reflected by the eye 1 and reflected and diffracted by the diffractive optical element 200-2 may be caused to enter the light reception element 300a.

Moreover, in the foregoing tenth embodiment, the description has been given referring to the image display apparatus including the eye information detection device 40 of the fourth embodiment as an example; however, an image display apparatus including the eye information detection device of any other embodiment is also achievable by adding similar configurations (the image light projection unit, the other diffractive optical element, the beam splitter, etc.).

12. <Eye Information Detection Device According to Eleventh Embodiment of Present Technology>

A description is given below of an eye information detection device 110 according to an eleventh embodiment (eye information detection devices 110-1 and 110-2 of Examples 1 and 2), with reference to the drawings.

(Eye Information Detection Device of Example 1 of Eleventh Embodiment)

A description is given below of the eye information detection device 110-1 of Example 1 of the eleventh embodiment, with reference to FIG. 21.

In the eye information detection device 110-1 of Example 1, a diffractive optical element 200-3 includes a first transmission diffraction section in which two or more diffraction portions 200d and 200e of a transmission type are stacked and a second transmission diffraction section in which two or more diffraction portions 200f and 200g of a transmission type are stacked, with respect to a combiner 200a (substrate). The non-visible light emitted from each non-visible light source and reflected by the eye 1 passes through the first transmission diffraction section, enters inside the combiner 200a, propagates inside the combiner 200a, and is caused to exit to outside from the combiner 200a via the second transmission diffraction section. The non-visible light having exited to the outside via the second transmission diffraction section is caused to enter the light reception element 300a of the light reception system 300-1. The diffraction portion 200d of the first transmission diffraction section and the second transmission diffraction portion 200f have, for example, substantially similar configurations. The diffraction portion 200e of the first transmission diffraction section and the diffraction portion 200g of the second transmission diffraction section have, for example, substantially similar configurations.

That is, the diffractive optical element 200-3 includes the first transmission diffraction section that is provided on a surface, of the combiner 200a, on the eye 1 side, and includes the two or more stacked diffraction portions 200d and 200e that transmit and diffract each non-visible light reflected by the eye 1 in a direction satisfying a total reflection condition inside the combiner 200a. In addition, the diffractive optical element 200-3 includes the second transmission diffraction section including the two or more stacked diffraction portions 200f and 200g that transmit and diffract each non-visible light, which has propagated inside the combiner 200a while being totally reflected, toward the light reception element 300a of the light reception system 300-1.

The light reception system 300-1 includes the single light reception element 300a. The light reception element 300a is provided, for example, in the vicinity of the surface, of the combiner 200a, on the eye 1 side.

In the eye information detection device 110, the two or more non-visible light sources 100a and 100b are turned on at different timings.

With the eye information detection device 110-1 of Example 1, it is possible to dispose the light reception element 300a in the vicinity of the combiner 200a, because a configuration in which the non-visible light reflected by the eye 1 is propagated inside the combiner 200a is employed. Accordingly, it is possible to reduce the size of the device.

(Eye Information Detection Device of Example 2 of Eleventh Embodiment)

A description is given below of the eye information detection device 110-2 of Example 2 of the eleventh embodiment, with reference to FIG. 22.

As illustrated in FIG. 22, the eye information detection device 110-2 of Example 2 has a configuration similar to that of the eye information detection device 110-1 of Example 1 described above, except that the configuration of the second transmission diffraction section differs.

In one example, the second transmission diffraction section of an eye information detection device 120 includes a prism 4000 provided on the surface, of the combiner 200a, on the eye 1 side. The prism 4000 is, for example, a triangular prism having a right triangular cross-section, and transmits, to the outside, the non-visible light totally reflected inside the combiner 200a. The non-visible light having passed through the prism 4000 is caused to enter the light reception element 300a.

The light reception element 300a is disposed, for example, to oppose an inclined surface (an exit surface) of the prism 4000.

In the eye information detection device 110-2, the two or more non-visible light sources 100a and 100b are turned on at different timings.

With the eye information detection device 110-2 of Example 2, it is possible to dispose the light reception element 300a in the vicinity of the combiner 200a because a configuration in which the non-visible light reflected by the eye 1 is propagated inside the combiner 200a is employed. Accordingly, it is possible to achieve size reduction.

13. <Eye Information Detection Device of Twelfth Embodiment of Present Technology>

A description is given below of an eye information detection device 120 of a twelfth embodiment, with reference to FIG. 23.

As illustrated in FIG. 23, in the eye information detection device 120 of the twelfth embodiment has a configuration similar to that of the eye information detection device 10-1 of Example 1 of the first embodiment described above and illustrated in FIG. 1, except that the light reception system 300 including the two or more light reception elements 300a and 300b is disposed on the opposite side to the eye 1 side of a plane 250 including the in-plane direction of the diffractive optical element 200, and that two diffraction portions 200h and 200i are of a transmission type.

Providing such a light reception system 300 is more effective, for example, in detecting the eye information in an image display apparatus such as an HMD that displays a VR image, as there is more space to lay out components in front of the user's face.

In the eye information detection device 120, the two diffraction portions 200h and 200i are of the transmission type. In this case, it is possible to cause the non-visible light emitted from each non-visible light source and reflected by the eye 1 to pass through the corresponding diffraction portion and the combiner 200a, exit from a surface, of the combiner 200a, on the opposite side to the surface on the eye 1 side, and enter the corresponding light reception element.

Note that in the twelfth embodiment described above, the description has been given referring to the example case where, in the eye information detection device 10-1 of Example 1 of the first embodiment described above, the light reception system 300 is disposed on the opposite side to the eye 1 side of the plane including the in-plane direction of the diffractive optical element 200, and the non-visible light reflected by the eye 1 is guided to the light reception element of the light reception system 300. However, it is possible to employ a similar configuration also in the eye information detection device of each Example of any other embodiment.

Further, the present technology may have the following configurations.

(1) An eye information detection device including:
    two or more non-visible light sources having different light emission wavelengths;
    a diffractive optical element disposed on an optical path of non-visible light emitted from each of the two or more non-visible light sources and reflected by an eye; and
    a light reception system that receives the non-visible light reflected by the eye and passing through the diffractive optical element.
(2) The eye information detection device according to (1), in which the light reception system is disposed on eye side of a plane including an in-plane direction of the diffractive optical element.
(3) The eye information detection device according to (1), in which the light reception system is disposed on opposite side to eye side of a plane including an in-plane direction of the diffractive optical element.
(4) The eye information detection device according to any one of (1) to (3), in which the diffractive optical element diffracts, toward the light reception system, the non-visible light reflected by the eye.
(5) The eye information detection device according to any one of (1) to (4), in which the diffractive optical element includes a diffraction portion that diffracts each of the two or more rays of non-visible light in a direction based on a wavelength thereof.
(6) The eye information detection device according to any one of claims (1) to (5), in which
    the light reception system includes a light reception element, and
    the two or more rays of non-visible light reflected by the eye in different directions and diffracted by the diffractive optical element in same direction are caused to enter the light reception element.
(7) The eye information detection device according to any one of (1) to (5), in which
    the light reception system includes two or more light reception elements, and
    the two or more rays of non-visible light reflected by the eye in same direction and diffracted by the diffractive optical element in different directions are caused to individually enter the two or more respective light reception elements.
(8) The eye information detection device according to any one of claims (1) to (7), in which the diffractive optical element includes two or more diffraction portions that each individually correspond to a wavelength of one of the two or more rays of non-visible light and each diffract the non-visible light having a corresponding wavelength in a direction based on the wavelength.
(9) The eye information detection device according to (8), in which the two or more diffraction portions are disposed at different positions in the in-plane direction of the diffractive optical element.
(10) The eye information detection device according to (9), in which
    the light reception system includes two or more light reception elements, and
    the two or more rays of non-visible light reflected by the eye and diffracted by the two or more respective diffraction portions individually enter the two or more respective light reception elements.
(11) The eye information detection device according to (8), in which the two or more diffraction portions are disposed at same position in the in-plane direction of the diffractive optical element.
(12) The eye information detection device according to (11), in which
    the light reception system includes a light reception element, and
    the two or more rays of non-visible light reflected by the eye in different directions and reflected and diffracted by the two or more respective diffraction portions in same direction are caused to enter the light reception element.
(13) The eye information detection device according to (11), in which
    the light reception system includes two or more light reception elements, and
    the two or more rays of non-visible light reflected by the eye in same direction and diffracted by the two or more respective diffraction portions in different directions are caused to individually enter the two or more respective light reception elements.
(14) The eye information detection device according to (11), in which
    the light reception system includes a light reception element, and
    the two or more rays of non-visible light reflected by the eye in same direction and diffracted by the two or more respective diffraction portions in same direction are caused to enter the light reception element.
(15) The eye information detection device according to any one of (1) to (14), in which the non-visible light emitted from each of the two or more non-visible light sources toward the eye and reflected by the eye is caused to enter the diffractive optical element.
(16) The eye information detection device according to any one of (1) to (15), in which the non-visible light emitted from each of the two or more non-visible light sources toward the diffractive optical element and diffracted by the diffractive optical element is caused to enter the eye.

(17) The eye information detection device according to any one of (1) to (16), in which the two or more non-visible light sources perform light emission at different timings.

(18) The eye information detection device according to any one of (1) to (17), in which the light reception system includes two or more light reception elements and a bandpass filter, the two or more light reception elements corresponding to the two or more respective non-visible light sources, the bandpass filter being disposed on an optical path of the non-visible light between the diffractive optical element and each of the two or more light reception elements and allowing the non-visible light to pass therethrough.

(19) The eye information detection device according to any one of (1) to (18), in which
the light reception system includes at least one light emission element including two or more light reception regions disposed two-dimensionally, and
a signal detection circuit that detects a signal outputted from each of the two or more light reception regions is further provided.

(20) The eye information detection device according to (19), in which number of the light reception regions is 4.

(21) The eye information detection device according to (19) or (20), in which
the light reception element includes two or more light reception elements, and
the two or more light reception elements differ from each other in number of the light reception regions.

(22) The eye information detection device according to any one of (19) to (21), in which
the two or more rays of non-visible light have different frequencies, and
the signal detection circuit detects a signal outputted from the light reception element when each of the two or more rays of non-visible light is received by the light reception element, on the basis of the frequency of the non-visible light.

(23) The eye information detection device according to any one of (19) to (21), in which
the two or more rays of non-visible light perform light emission in opposite phases, and
the signal detection circuit detects a signal outputted from the light reception element when each of the two or more rays of non-visible light is received by the light reception element, on the basis of a phase of the non-visible light. (24) The eye information detection device according to any one of (1) to (23), in which the light reception system includes a light reception element and a toroidal lens, the toroidal lens being disposed on an optical path of the non-visible light between the diffractive optical element and the light reception element.

(25) The eye information detection device according to any one of (1) to (5), in which
the light reception system includes a light reception element,
the two or more non-visible light sources include a first non-visible light source and a second non-visible light source, the first non-visible light source emitting first non-visible light having a center wavelength in a range from 700 nm to 900 nm, the second non-visible light source emitting second non-visible light having a center wavelength in a range from 900 nm to 1000 nm, and
the diffractive optical element diffracts, toward the light reception element, the first non-visible light and the second non-visible light reflected by the eye in same direction. (26) The eye information detection device according to any one of (1) to (5), further including a substrate on which the diffractive optical element is provided, in which
the light reception system is provided on eye side of the substrate, and
the diffractive optical element causes the non-visible light reflected by the eye to enter inside the substrate, propagate inside the substrate, and exit toward the light reception system.

(27) The eye information detection device according to (26), in which
the diffractive optical element includes
a first transmission diffraction section provided on a surface of the substrate on the eye side, the first transmission diffraction section transmitting and diffracting the non-visible light reflected by the eye, in a direction satisfying a total reflection condition inside the substrate, and
a second transmission diffraction section transmitting and diffracting, toward the light reception system, the non-visible light propagating while being totally reflected inside the substrate.

(28) The eye information detection device according to any one of (1) to (27), in which the eye information detection device is of a head-mounted type.

(29) An image display apparatus including the eye information detection device described above.

(30) The image display apparatus according to (29), in which the image display apparatus further includes
an image light projection unit that projects image light, and
another diffractive optical element provided in the diffractive optical element of the eye information detection device and diffracting the image light from the image light projection unit toward the eye.

(31) The image display apparatus according to (30), in which
the reception system of the eye information detection device includes a light reception element, and
the image display apparatus further includes a beam splitter, the beam splitter being disposed between the other diffractive optical element and the light reception element, the beam splitter reflecting, toward the other diffractive optical element, a portion of the image light projected from the image light projection unit, and allowing another portion thereof to pass therethrough.

(32) The image display apparatus according to (31), in which the image light projection unit is disposed on opposite side to the eye side of the beam splitter.

DESCRIPTION OF REFERENCE SIGNS

1: eye, 10-1 to 10-4, 20-1 to 20-3, 30-1 to 30-4, 40, 50, and 60: eye information detection device, 100a and 100b: non-visible light source, 200, 200-1, 200-2, and 200-3: diffractive optical element, 200b, 200c, 200d, 200e, 200f, 200g, 200h, and 200i: diffraction portion, 250: a plane including an in-plane direction of a diffractive optical element, 300 and 300-1: light reception system, 300a and 300b: light reception element, 300a1, 300b1, 300c1, and 300d1: light reception region, 300c and 300d: toroidal lens, 300e and 300f: bandpass filter, 2000: another diffractive optical element, 3000: beam splitter, 4000: prism (second transmission diffraction portion), NV1 and NV2: non-visible light, IL: image light.

The invention claimed is:

1. An eye information detection device, comprising:
at least two non-visible light sources having different light emission wavelengths, wherein
each non-visible light source of the at least two non-visible light sources is configured to emit non-visible light;
a diffractive optical element on an optical path of the non-visible light emitted from each of the at least two non-visible light sources and reflected by an eye; and
a light reception system configured to receive the non-visible light reflected by the eye and passed through the diffractive optical element, wherein
the light reception system includes at least two light reception elements and a bandpass filter,
the at least two light reception elements correspond to the at least two non-visible light sources,
the bandpass filter is on the optical path of the non-visible light between the diffractive optical element and each of the at least two light reception elements, and
the bandpass filter is configured to allow the non-visible light to pass therethrough.

2. The eye information detection device according to claim 1, wherein the light reception system is on an eye side of a plane including an in-plane direction of the diffractive optical element.

3. The eye information detection device according to claim 2, wherein the diffractive optical element is configured to diffract, toward the light reception system, the non-visible light reflected by the eye.

4. The eye information detection device according to claim 3, wherein the diffractive optical element includes a diffraction portion that is configured to diffract each of at least two rays of the non-visible light in a direction based on a wavelength of each ray of the at least two rays of the non-visible light.

5. The eye information detection device according to claim 3, wherein
at least two rays of the non-visible light reflected by the eye in different directions and diffracted by the diffractive optical element in a same direction enter a light reception element of the at least two light reception elements.

6. The eye information detection device according to claim 3, wherein
at least two rays of the non-visible light reflected by the eye in a same direction and diffracted by the diffractive optical element in different directions individually enter the at least two light reception elements.

7. The eye information detection device according to claim 3, wherein
the diffractive optical element includes at least two diffraction portions that each individually correspond to a wavelength of one of at least two rays of the non-visible light, and
each diffraction portion of the at least two diffraction portions is configured to diffract the non-visible light having a specific wavelength in a direction based on a wavelength of each ray of the at least two rays of the non-visible light.

8. The eye information detection device according to claim 7, wherein the at least two diffraction portions are at different positions in the in-plane direction of the diffractive optical element.

9. The eye information detection device according to claim 8, wherein
the at least two rays of the non-visible light reflected by the eye and diffracted by the at least two diffraction portions individually enter the at least two light reception elements.

10. The eye information detection device according to claim 7, wherein the at least two diffraction portions are at a same position in the in-plane direction of the diffractive optical element.

11. The eye information detection device according to claim 10, wherein
the at least two rays of the non-visible light reflected by the eye in different directions and diffracted by the at least two diffraction portions in a same direction enter a light reception element of the at least two light reception elements.

12. The eye information detection device according to claim 10, wherein
the at least two rays of the non-visible light reflected by the eye in a same direction and diffracted by the at least two diffraction portions in different directions individually enter the at least two light reception elements.

13. The eye information detection device according to claim 10, wherein
the at least two rays of the non-visible light reflected by the eye in a same direction and diffracted by the at least two diffraction portions in a same direction enter a light reception element of the at least two light reception elements.

14. The eye information detection device according to claim 1, wherein the light reception system is on an opposite side to an eye side of a plane including an in-plane direction of the diffractive optical element.

15. The eye information detection device according to claim 1, wherein the non-visible light emitted from each of the at least two non-visible light sources toward the eye and reflected by the eye enters the diffractive optical element.

16. The eye information detection device according to claim 1, wherein the non-visible light emitted from each of the at least two non-visible light sources toward the diffractive optical element and diffracted by the diffractive optical element enters the eye.

17. The eye information detection device according to claim 1, wherein the at least two non-visible light sources are further configured to emit the non-visible light at different timings.

18. The eye information detection device according to claim 1, wherein
a light reception element of the at least two light reception elements includes at least two light reception regions which are two-dimensionally arranged,
each of the at least two light reception regions is configured to output a signal, and
the eye information detection device further includes a signal detection circuit configured to detect the signal outputted from each of the at least two light reception regions.

19. The eye information detection device according to claim 18, wherein a number of the at least two light reception regions is 4.

20. The eye information detection device according to claim 18, wherein
the at least two light reception elements have different number of the at least two light reception regions.

21. The eye information detection device according to claim 18, wherein
at least two rays of the non-visible light have different frequencies, and
the signal detection circuit is further configured to detect the detects a-signal outputted from the light reception element, wherein the detection is based on reception of each of the at least two rays of the non-visible light by the light reception element and the different frequencies of the at least two rays of the non-visible light.

22. The eye information detection device according to claim 18, wherein
at least two rays of the non-visible light execute light emission in opposite phases, and
the signal detection circuit is further configured to detect the signal outputted from the light reception element, wherein the detection is based on reception of each of the at least two rays of the non-visible light by the light reception element and a phase of the non-visible light.

23. The eye information detection device according to claim 1, wherein
the light reception system further includes a light reception element and a toroidal lens, and
the toroidal lens is on the optical path of the non-visible light between the diffractive optical element and the light reception element.

24. The eye information detection device according to claim 1, wherein
the light reception system further includes a light reception element,
the at least two non-visible light sources include a first non-visible light source and a second non-visible light source,
the first non-visible light source is configured to emit first non-visible light having a center wavelength in a range from 700 nm to 900 nm,
the second non-visible light source is configured to emit second non-visible light having a center wavelength in a range from 900 nm to 1000 nm,
the diffractive optical element is configured to diffract, toward the light reception element, the first non-visible light and the second non-visible light, and
the first non-visible light and the second non-visible light are reflected by the eye in a same direction.

25. The eye information detection device according to claim 1, further comprising a substrate, wherein
the diffractive optical element is on the substrate,
the light reception system is on an eye side of the substrate, and
the diffractive optical element is configured to cause the non-visible light reflected by the eye to enter inside the substrate, propagate inside the substrate, and exit toward the light reception system.

26. The eye information detection device according to claim 25, wherein the diffractive optical element includes a first transmission diffraction section on a surface of the substrate on the eye side, wherein
the first transmission diffraction section is configured to transmit and diffract the non-visible light reflected by the eye, in a direction that satisfies a total reflection condition inside the substrate; and
a second transmission diffraction section configured to transmit and diffract, toward the light reception system, the non-visible light that propagates while being totally reflected inside the substrate.

27. The eye information detection device according to claim 1, wherein the eye information detection device is of a head-mounted type.

28. An image display apparatus, comprising:
an eye information detection device which comprises:
at least two non-visible light sources having different light emission wavelengths, wherein
each non-visible light source of the at least two non-visible light sources is configured to emit non-visible light;
a first diffractive optical element on an optical path of the non-visible light emitted from the each of the at least two non-visible light sources and reflected by an eye; and
a light reception system configured to receive the non-visible light reflected by the eye and passed through the first diffractive optical element, wherein
the light reception system includes at least two light reception elements and a bandpass filter,
the at least two light reception elements correspond to the at least two non-visible light sources,
the bandpass filter is on the optical path of the non-visible light between the first diffractive optical element and each of the at least two light reception elements, and
the bandpass filter is configured to allow the non-visible light to pass therethrough according to claim 1.

29. The image display apparatus according to claim 28, further comprising:
an image light projection unit configured to project image light; and
a second diffractive optical element, in the first diffractive optical element of the eye information detection device, configured to diffract the image light from the image light projection unit toward the eye.

30. The image display apparatus according to claim 29, wherein
the light reception system of the eye information detection device further includes a beam splitter,
the beam splitter is between the second diffractive optical element and a light reception element of the at least two light reception elements, and
the beam splitter is configured to:
reflect, toward the second diffractive optical element, a first portion of the image light projected from the image light projection unit; and
allow a second portion of the image light to pass therethrough.

31. The image display apparatus according to claim 30, wherein the image light projection unit is on an opposite side to an eye side of the beam splitter.

* * * * *